United States Patent
Rostagni et al.

(10) Patent No.: US 10,255,314 B2
(45) Date of Patent: Apr. 9, 2019

(54) COMPARISON OF BLOCK BASED VOLUMES WITH ONGOING INPUTS AND OUTPUTS

(71) Applicant: International Business Machines Corporation, Armonk, NY (US)

(72) Inventors: Florent C. Rostagni, Southampton (GB); John P. Wilkinson, Salisbury (GB)

(73) Assignee: International Business Machines Corporation, Armonk, NY (US)

(*) Notice: Subject to any disclaimer, the term of this patent is extended or adjusted under 35 U.S.C. 154(b) by 0 days.

(21) Appl. No.: 15/460,684

(22) Filed: Mar. 16, 2017

(65) Prior Publication Data

US 2018/0268016 A1    Sep. 20, 2018

(51) Int. Cl.
*G06F 17/30* (2006.01)
(52) U.S. Cl.
CPC .................. *G06F 17/30371* (2013.01)
(58) Field of Classification Search
USPC ............... 707/610, 640, 661, 674, 692, 694
See application file for complete search history.

(56) References Cited

U.S. PATENT DOCUMENTS

| | | | |
|---|---|---|---|
| 8,812,456 B2 * | 8/2014 | Daga ................. | G06F 17/30156 707/664 |
| 9,043,292 B2 | 5/2015 | Nag Yasa et al. | |
| 9,158,630 B1 | 10/2015 | Natanzon | |
| 9,378,106 B1 | 6/2016 | Ben-Moshe et al. | |
| 2007/0073937 A1 * | 3/2007 | Feinberg .............. | G06F 9/445 710/62 |
| 2008/0208923 A1 | 8/2008 | Watanabe et al. | |
| 2013/0138607 A1 | 5/2013 | Bashyam et al. | |
| 2013/0262404 A1 * | 10/2013 | Daga ................. | G06F 17/30156 707/692 |
| 2014/0143206 A1 | 5/2014 | Pittelko | |
| 2014/0358873 A1 * | 12/2014 | Daga ................. | G06F 17/30156 707/692 |
| 2015/0309733 A1 | 10/2015 | Fornander et al. | |
| 2016/0132523 A1 | 5/2016 | Traeger | |
| 2016/0210307 A1 | 7/2016 | Pittelko | |

OTHER PUBLICATIONS

Rostagni et al., "Comparison of Block Based Volumes With Ongoing Inputs and Outputs", U.S. Appl. No. 15/822,250, filed Nov. 27, 2017, 62 pages.

\* cited by examiner

*Primary Examiner* — Sana A Al-Hashemi
(74) *Attorney, Agent, or Firm* — Edward J. Wixted, III

(57) ABSTRACT

A process compares respectively corresponding data blocks in redundant data storage systems having ongoing I/O activity, to detect discrepancies between blocks that are supposed to be identical. Storage systems have replica copies of the data. A hashing algorithm processes a first data block from to produce a first hash. The hashing algorithm processes the second data block (a replica of the first data block) to produce a second hash. The first and second hashes are compared to determine whether or not the underlying data blocks match each other. If a write command directed to the data blocks is received during the overall comparison process, the comparison process is halted to permit the write command to proceed without adverse impact from the comparison process. The comparison process is then restarted.

14 Claims, 15 Drawing Sheets

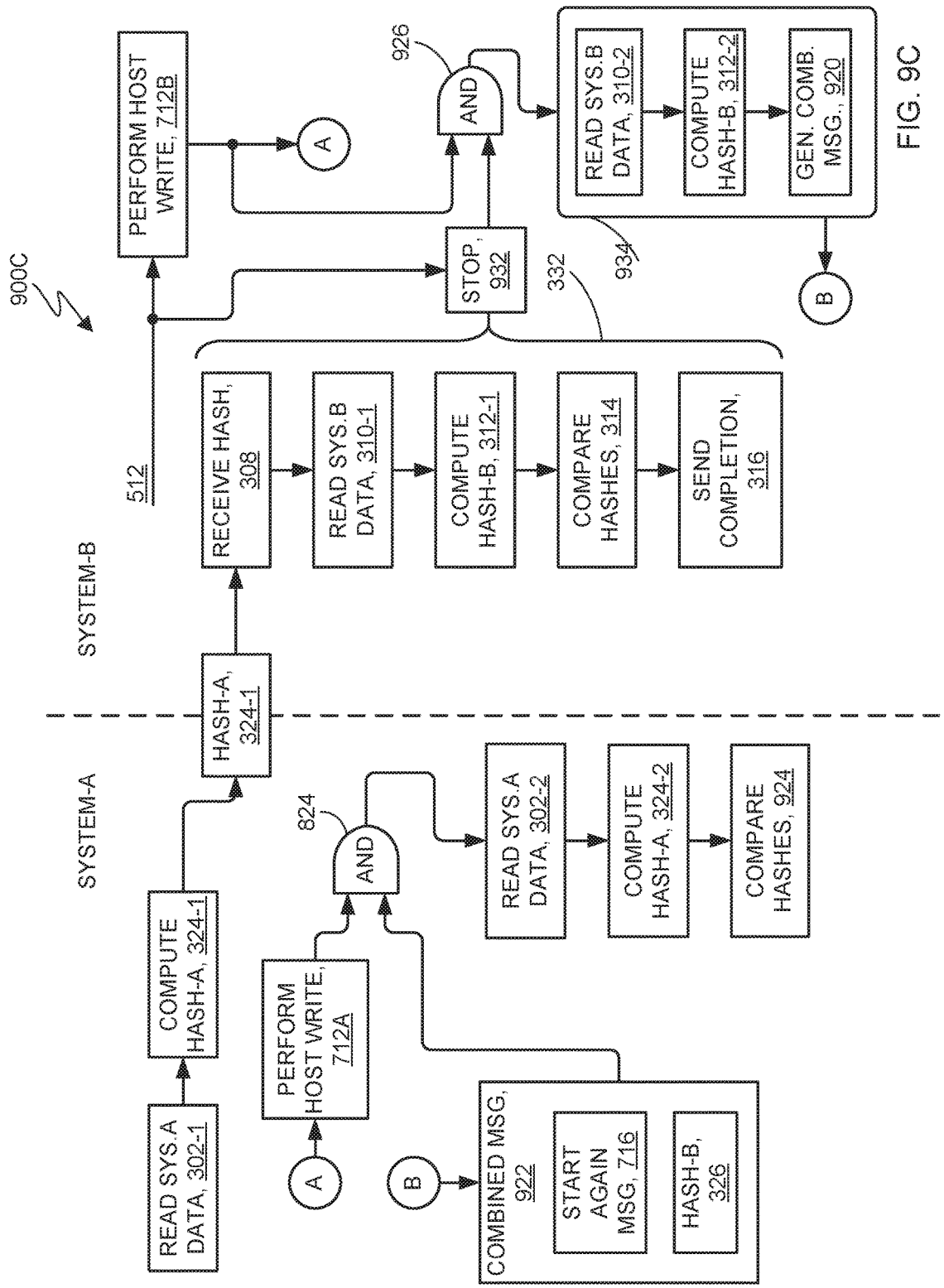

COMPARISON OF BLOCK BASED VOLUMES WITH ONGOING INPUTS AND OUTPUTS

BACKGROUND OF THE INVENTION

The present invention relates generally to data backup in a distributed storage system comprising two different volumes located in different systems, and more particularly to comparing data between the two volumes.

In storage systems, it is common to have two or more volumes containing the same data. In general, one copy is the production volume (the active volume) which is the copy where data are written to and read from, while at least one secondary volume is a copy of the production volume.

In some storage systems (active-active systems), both copies of the data may act as production volumes. Either system may be treated as a primary system, while the other system serves as a secondary system (for example, to back each other up, or for load sharing). I/O activity (particularly, write activity) at either system is duplicated at the other system to keep the volumes synchronized.

A secondary volume can be used as back-up for disaster recovery, for archival purposes, for a point-in-time "snapshot", for testing while ensuring the production copy is not corrupted, etc. In at least the case where a back-up copy for disaster recovery is being maintained, both copies (primary and secondary) have to remain continuously synchronized.

SUMMARY

According to an aspect of the present invention, there is a method, computer program product and/or system for comparing storage volumes having ongoing input/output (I/O) activity that performs the following operations (not necessarily in the following order): (i) receiving, by a local system, and from a requestor, a request to conduct a comparison process to determine whether or not a local data block on a local volume is identical to a remote data block on a remote volume; (ii) responsive to receiving the request to conduct the comparison process, initiating the comparison process; (iii) computing a first local hash based on the local data block; (iv) receiving a host write command, with respect to the local data block and the remote data block, where the host write command is received during execution of the comparison process, and where the host write command has a higher execution priority than has the comparison process; (v) responsive to receiving the host write command, modifying the local data block in accordance with the host write command, to produce a modified local data block; (vi) computing a second local hash based on the modified local data block; (vii) sending the second local hash to a remote computer system for comparison with a remote hash; (viii) receiving, from the remote computer system, a write completion message, indicating that the host write command has been processed at the remote system; (ix) receiving, from the remote computer system, a comparison result, wherein the comparison result includes information to indicate whether or not the second local hash and the remote hash are identical; and (x) sending the comparison result to the requestor.

According to a further aspect of the present invention, there is a method, computer program product and/or system for comparing storage volumes having ongoing input/output (I/O) activity that performs the following operations (not necessarily in the following order): (i) receiving, by a local system and from a remote system, a host write command, directed to a local data block of a local volume; (ii) receiving, by the local system and from the remote system, a request to compare a local hash against a remote hash, where the request includes the remote hash and an identifier to identify the local data block; (iii) modifying the local data block in accordance with the host write command, to produce a modified local data block; (iv) sending a write completion message to the remote system; (v) reading the modified local data block; (vi) computing the local hash based on the modified local data block; (vii) comparing the local hash against the remote hash to produce a comparison result; and (viii) sending the comparison result to the remote system.

BRIEF DESCRIPTION OF THE DRAWINGS

FIG. 9C is a functional block, and data flow diagram depicting an alternate fourth collision scenario handling method in accordance with at least one embodiment of the present invention;

DETAILED DESCRIPTION

Figure 1:
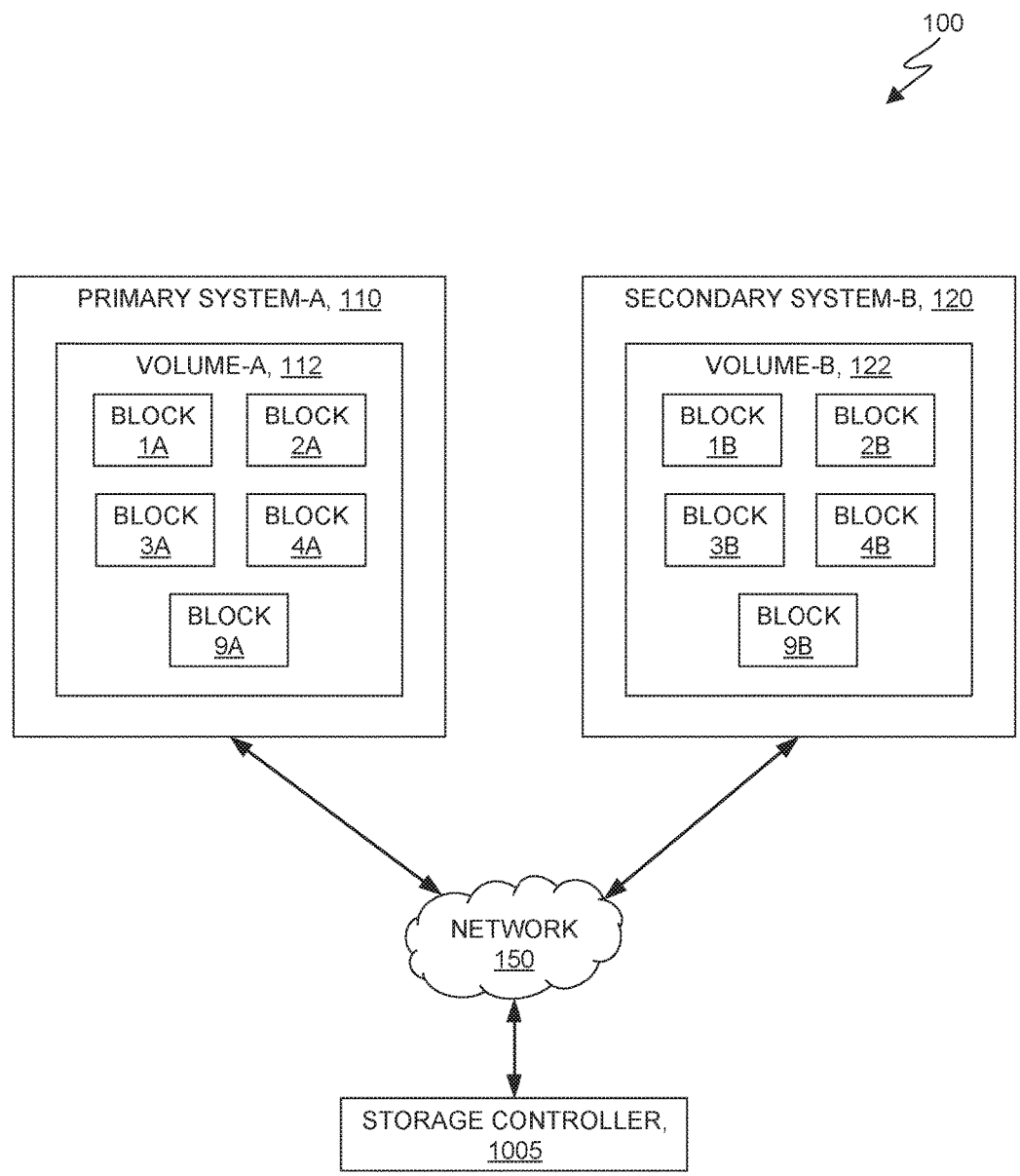
FIG. 1 is a functional block diagram depicting a computing environment in accordance with at least one embodiment of the present invention.

Embodiments of the present invention compare replicate data on a block-based storage system having ongoing input/ output (I/O) activity to detect any differences between the replicated data. The comparison process proceeds without impacting the performance or latency of the ongoing I/O activity. Data comparison uses minimal bandwidth and avoids quiescing (avoids inhibiting, delaying, or interrupting) host I/Os.

In some embodiments of the present invention, a method to compare two replicas of the same data is accomplished by using the following procedure: (i) hashing both replicas of the data to create respective hashes (sometimes herein referred to as "hash codes"); (ii) sending the hash from the replica in one system to the other system; and (iii) comparing the two hashes at the other system to determine a comparison result. The comparison result includes information to indicate whether or not the respective hashes are found to be identical. Given a sufficiently well-chosen hash algorithm, corresponding blocks are considered to be identical if their respective hashes are identical, and the blocks are considered to be discrepant if their respective hashes are not identical. Aspects of hash suitability are discussed below in the section Choosing the hashing algorithm.

The comparison process is conducted in part through messaging between the two systems. Messages that are passed between the storage systems are assumed to be ordered (that is, messages are received in the same order as they were sent, or if received in a different order, are nevertheless processed at the receiving system in the same order as they were sent by the sending system). Some embodiments of the present invention employ a mechanism (the details of which are outside the scope of this disclosure) to guarantee that messages sent between System-A and System-B are received and/or processed at the receiving system in the same order as they were sent from the sending system.

Host I/Os are allowed to take place unimpeded during the comparison process. If a write command is received at either replica during the hashing/comparison process, the write operation, and its duplicate operation at the other replica, are allowed to proceed without delay or interruption (meaning both replicas of the data are updated according to the write command). The comparison process is stopped, to allow the write operations to take place at both replicas. The comparison process is restarted after completion of the write operation in the respective replica, to avoid false positive and false negative types of errors with regard to the comparison between the two volumes.

Host I/O operations will generally not be delayed because of the comparison process (except in limited circumstances: see Continuous collision between a chunk comparison and host I/Os below). In particular, host I/Os not colliding with chunks being compared may have the same latency as if there were no ongoing comparison process. A collision with a host I/O occurs when a host I/O is submitted to a data block (sometimes herein referred to as a data chunk) that is being compared. Host I/Os colliding with chunks being compared may have an increased latency that is significantly less than the latency for round-trip communications between the systems. Embodiments keep track of which data chunks are being compared. When a host write operation takes place, each system can detect the collision and take appropriate action.

The present invention will now be described in detail with reference to the Figures.

FIG. 1 is a functional block diagram depicting a computing environment 100 in accordance with an embodiment of the present invention. Computing environment 100 includes: primary system-A 110 (sometimes herein referred to as System-A); volume-A 112; data blocks 1A, 2A, 3A, 4A and 9A; secondary system-B 120 (sometimes herein referred to as System-B); volume-B 122; data blocks 1B, 2B, 3B, 4B and 9B; network 150; and storage controller 1005. Primary system-A 110 and secondary system-B 120, can each be any of a desktop computer, a laptop computer, a specialized computer server, or any other computer system known in the art. In some embodiments, primary system-A 110 and secondary system-B 120 each represents a computer system utilizing clustered computers and components to act as a single pool of seamless resources when accessed through network 150. In general, primary system-A 110 and secondary system-B 120 are representative of any electronic device, or combination of electronic devices, capable of executing machine-readable program instructions, as described in greater detail with regard to FIG. 11. Volume-A 112 and volume-B 122 represent block based storage volumes. Volume-A 112 includes any number of data blocks, including data blocks 1A, 2A, 3A, 4A and 9A. Data block 9A can be any number of additional blocks on volume-A. Volume-B 122 includes data blocks 1B, 2B, 3B, 4B and 9B. Data block 9B can be any number of additional data blocks on volume-B. Storage controller 1005 is a storage controller in accordance with at least one embodiment of the present invention. Storage controller 1005 may reside in primary system-A 110, in secondary system-B 120, or in a different system, not shown in FIG. 1.

To keep data on a secondary volume synchronized with the corresponding data on the primary volume, it may be useful to detect any differences in the data between the two volumes. Some embodiments of the present invention compare data on at least two volume copies in a way that does not require quiescence of I/Os on either host, and effectively compares all the data by sending proxy data (such as a hash of the real data) that represents the real data, but that is much smaller (much fewer bytes) than the real data from which the hash was generated.

Some embodiments of the present invention compare a primary copy of a data block against a secondary copy (sometimes referred to as a duplication copy, or a replicate) of the data block. More particularly, some embodiments seek to answer the question of whether or not the primary copy of the data and the secondary copy are identical. The primary and secondary copies may be dispersed among any number of systems, even systems that are widely physically separated. A hash algorithm is used to independently hash the primary and secondary copies of the data block. Comparisons of respective data blocks in a series of data blocks can proceed independently of each other. A hash of the data block on the primary system is sent to the secondary system. The secondary system receives the hash, and in response prepares a hash of the corresponding data block on the secondary system. The secondary system then compares the two hashes to test for equality. If the hash from the sending system is identical to the hash from the receiving system, the data blocks from which the respective hashes were generated are considered to be equal, although there may be a negligible but finite probability, depending inter alia on the hashing algorithm used, that the data blocks are not equal, yielding a false positive type of error. (Aspects of hash suitability are discussed below in the section Choosing the hashing algorithm.) A discrepancy between these hashes indicates the corresponding underlying datasets are also discrepant. In such a case, corrective measures outside the scope of the present disclosure may be taken to address the discrepancy. For simplicity herein, discussion will focus on two copies of the data, respectively on two systems, either two peer systems, or a primary system and a secondary system. It is to be understood that embodiments of the present invention can be applied to environments that include more than two systems and more than two copies of the data. It is to be further understood that between two systems, either system may be interchangeably designated as the primary system, and/or can be considered a peer system in which neither system is the primary system and neither system is the secondary system. For the sake of convention, as used herein, the primary system (typically System-A in the Figures) will be considered to be the system that first receives a command to begin a comparison process. However in some embodiments, that may not necessarily be the case.

While references are made herein to a "primary copy" and a "secondary copy" of the same data, it is to be understood that these copies are intended to be identical, but in some circumstances (such as resulting from occurrence of bit errors, software errors, malicious activity, or other types of data corruption), the copies may not be identical. Embodiments of the present invention aim to discover a mismatch between the two copies that are intended to be identical but are in fact not identical.

Large volumes of data are thus compared while using a relatively small amount of bandwidth. For example, a hash is generally some orders of magnitude smaller than the underlying data from which the hash is generated. In some embodiments, a hash is approximately 0.25 percent ($\frac{1}{400}^{th}$) of the size of the data from which the hash is derived.

Further, some embodiments of the present invention use a system of priority to provide a comparison tool that runs in the background, with effectively no impact on host I/O activity, wherein the execution priority of an I/O operation, with respect to a data block, is higher than the execution priority of a comparison process with respect to the same data block.

Some embodiments of the present invention compare data between two different volumes. The volumes may be located in the same computer system, or in different computer systems. The systems may be in the same or different geographical locations. The comparison between the volumes is accomplished with minimal usage of bandwidth and without quiescing host I/Os (meaning without having to stop, delay, interrupt, or otherwise negatively impact inputs and outputs from progressing when an I/O command collides with a comparison process in progress). The comparison in general is accomplished by the following procedure: (i) hashing the data at both volumes; (ii) sending the hash from one system to the other; (iii) comparing the hashes; and/or (iv) stopping and subsequently re-starting the comparison process if an I/O operation collides with the comparison process, to ensure that both systems have been updated in accordance with the I/O operation before the respective hashes are generated.

As used and referred to herein, the terms "grain", "data block", "block" and "data chunk" are synonymous, and refer to the same region of data. In some embodiments of the present invention, a data block corresponds to a contiguous 8 KB (8 kilobyte) region of data. In some embodiments, a data block may be a larger or smaller region of data, and in some embodiments, a data block may include non-contiguous regions of data, and may even be data, for instance, that is reassembled from multiple storage devices such as striped data stored on a redundant array of independent disks (RAID) system.

In some embodiments of the present invention, data is read and split into a series of data chunks. The aim of splitting the data into chunks is to use a global and coherent unit to compute the hashes through the entire volume, and to keep track of the progress of the overall comparison process. The size of the data chunks and the size of the hashes will thus define a compression ratio. Data chunks of any size can be chosen. Any hashing algorithm can be used, including "secure" and non-secure algorithms. The size of the hash is determined by the choice of the hashing algorithm. Some embodiments of the present invention use the SHA-1 algorithm, which produces hashes of 20 Bytes in size. The combination of using SHA-1 with data chunks of 8 KB (for example) achieves an effective compression ratio of 400:1 (8000 Bytes/20 Bytes). Other hashing functions (for example, SHA-2, SHA-3, MD5, etc.) may be used, and other data chunk sizes may be chosen and used while remaining within the scope and spirit of the present invention. Thus, different compression ratios can be achieved. Depending on the hashing function chosen, some security functionality may be introduced into an application in accordance with embodiments of the present invention.

Alternatively, other algorithms considered to be hashing or non-hashing algorithms, such as a cyclic redundancy check (CRC) value, may be used, in some embodiments of the present invention, for detection of a discrepancy between two data chunks. Using CRC by way of example, a CRC value could be computed from a data chunk on one system. The CRC value alone (not appended to the data chunk as CRC is typically used) would then be transmitted to the other system, which reads the corresponding data chunk from storage, computes a CRC value based on that data chunk, then compares the two CRC values to determine if there's a discrepancy between the two data chunks. Regardless of the algorithm used, whether the algorithm is considered to be a hashing algorithm or not, and secure or not, the output of the algorithm is herein referred to as a "hash".

Depending on which algorithm is chosen, the algorithm: (i) may be more or less sensitive (than using certain hash functions described above) at detecting discrepancies between the data chunks being compared; (ii) may be more or less secure; and/or (iii) may be faster or slower than other algorithms.

Choosing a data chunk size involves a tradeoff between the granularity of data comparison, and bandwidth requirements. As the chosen data chunk size decreases, detecting differences isolated to smaller memory regions is made possible, but at the cost of increasing the number of data chunks that need to be compared as well as increasing bandwidth usage in sending the corresponding hashes. In capturing differences, data chunks of 8 KB represents one compromise between fine detection of differences while keeping the bandwidth requirements within an acceptable range.

In a block storage systems, data is stored in blocks (also sometimes referred to herein as "chunks" or "data chunks") of contiguous storage, the blocks having a predetermined length. In some embodiments of the present invention, where a storage system is not considered to be a "block storage system", a volume storage system may be conceptually divided into "blocks" of data and comparisons may be conducted against any or all of the blocks in respective copies of the volumes.

A general process overview employed in some embodiments of the present invention will now be discussed. The following assumptions are made: (i) there are two different systems, System-A and System-B; (ii) each system has a block storage system; (iii) each system volume is a copy of the other; (iv) the two volume copies are intended to be identical (for example, redundant copies in an active-active replication environment as well as in an active-passive replication environment which is a subset of an active-active system); (v) System-A and System-B communicate with each other over a network, using, for example, internet bandwidth; (vi) messaging between both systems is ordered, meaning that messages sent from System-A to System-B are treated at System-B in the order in which they were sent, even if they arrive at System-B out of order; and/or (vii) a reliable and fast hash technology (such as SHA-2, MD5, etc.) is available to compute hashes of the data stored on the back-end storage (the volume copies). The two systems, System-A and System-B may be on separate hardware, or the same hardware (for example, as two separate virtual machines operating on the same hardware). An active-active relationship between two copies of data means that either copy can receive a host write command and the host write command is to be replicated on the other copy.

Figure 2A:
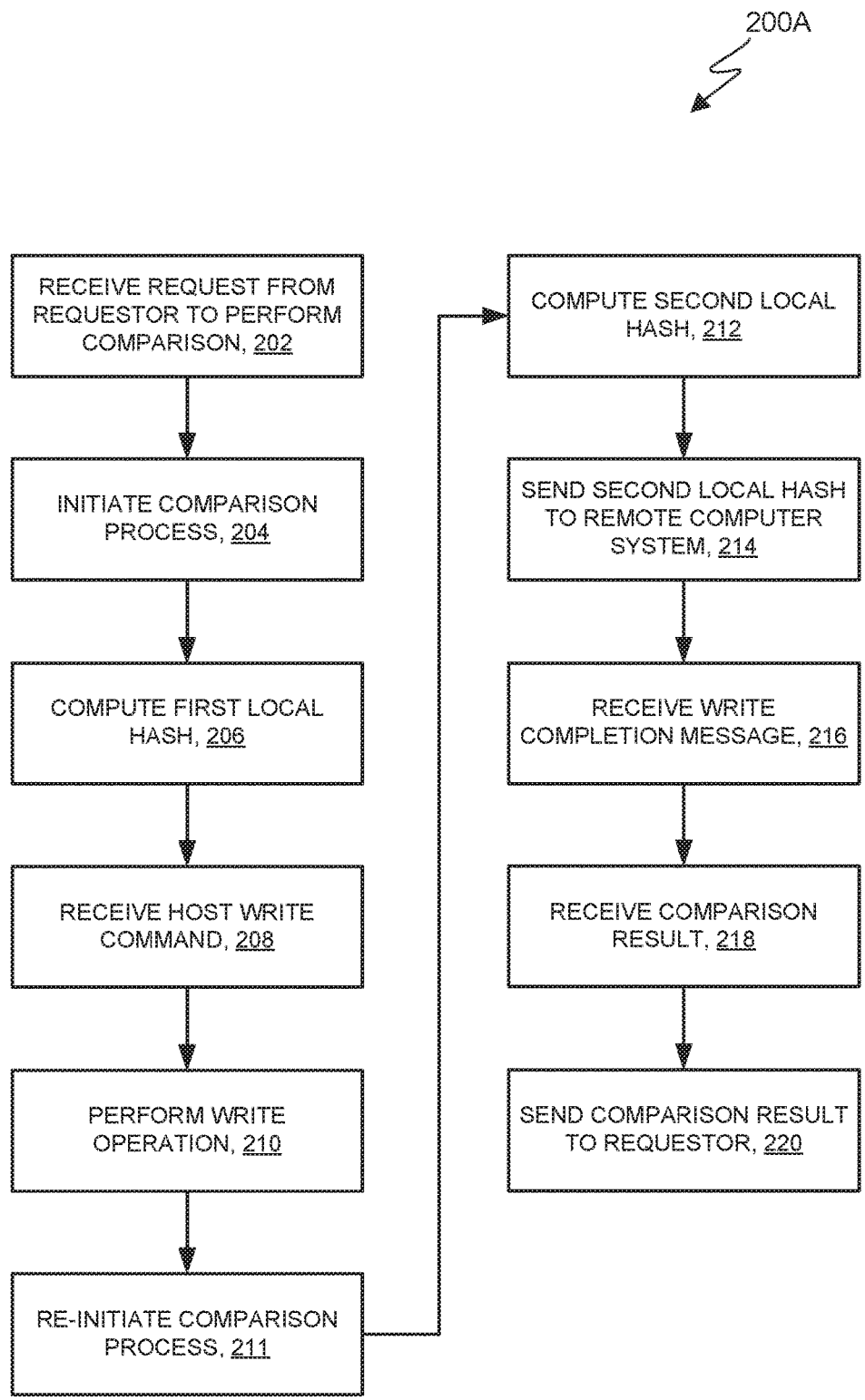
FIG. 2A is a flowchart depicting a collision handling method in accordance with at least one embodiment of the present invention.
Figure 2B:
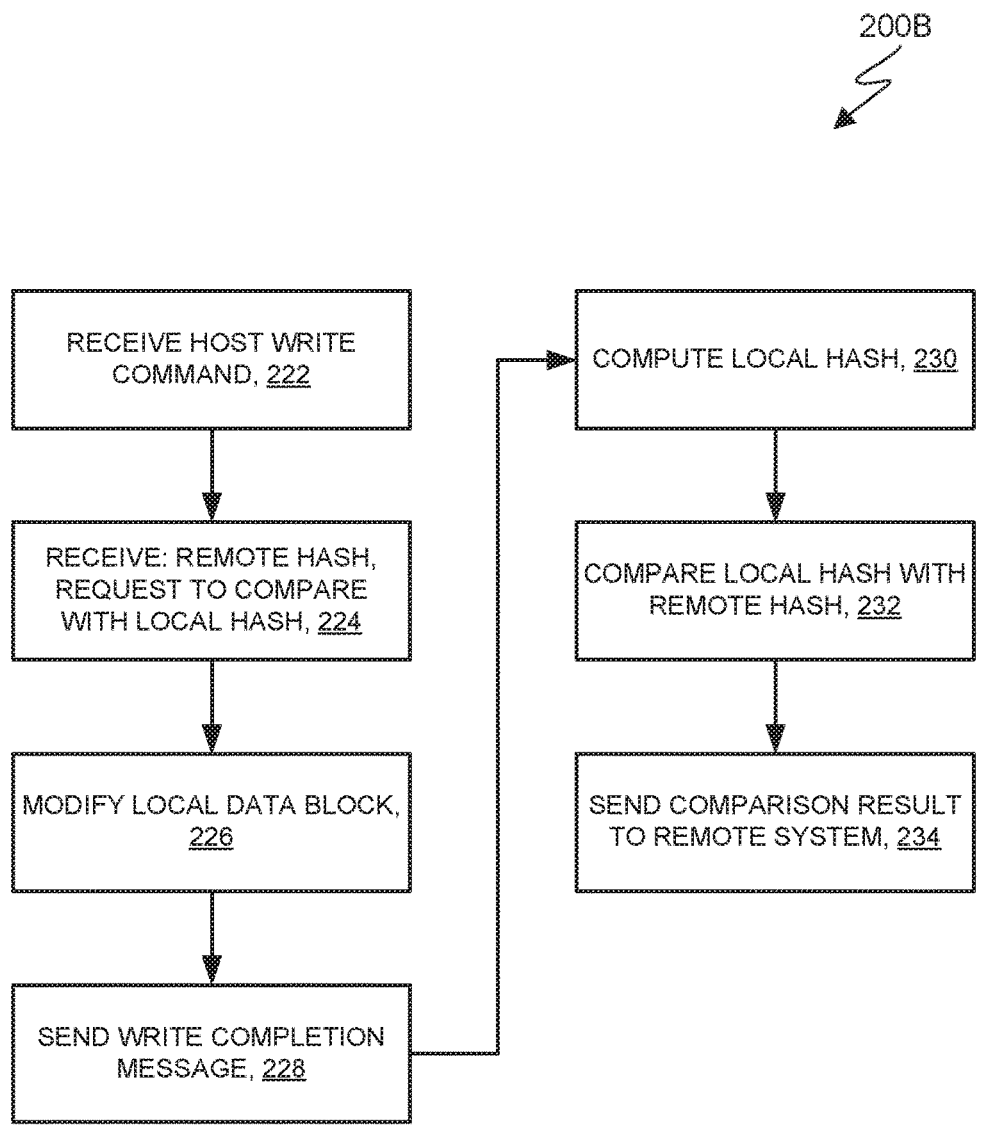
FIG. 2B is a flowchart depicting a collision handling method in accordance with at least one embodiment of the present invention.

Under the assumptions laid out in the paragraph above, a general process will now be described, with reference to FIGS. 2A and 2B. Flowchart 200A of FIG. 2A shows a method in accordance with some embodiments of the present invention, from the perspective of a primary system (a system receiving the command to commence a comparison process). Flowchart 200B of FIG. 2B shows the same method, but from the perspective of a secondary system. In the example embodiment of flowchart 200A, a host write command collides with an ongoing hashing process, as will be discussed in the paragraphs below, particularly with respect to operation 208.

With reference now to flowchart 200A of FIG. 2A, the process begins at operation 202 where the primary system receives a request, from a requesting system, to conduct a comparison of a local data block on the primary system and a corresponding remote data block on a secondary system.

Processing proceeds to operation 204, where the primary system initiates a comparison process. At this stage, the comparison process includes: (i) reading the local data block from storage; (ii) computing a local hash (operation 206) based on the local data block; (iii) composing a message that will be sent to the secondary system, where the message includes the local hash; and (iv) sending the message to the secondary system.

Further to item (i) in the paragraph above, in some embodiments of the present invention, any time data is read, this read may be satisfied by: (i) accessing a data cache in the memory of the storage system; or (ii) by flushing any changed write data stored in the data cache for that data block to the physical storage, then reading the data back from the physical storage. Using a cache may minimize the latency of this read operation, whereas reading from the physical storage may guarantee that the data was correctly stored on disk. The correct choice (whether to read from cache or from the physical storage) may depend on the nature and type(s) of failures that the comparison process is designed to protect against.

Processing proceeds to operation 208, where the primary system receives a host write command directed to the local data block. The host write command collides with the comparison process begun at operation 204 and is in progress at the time the host write command arrives at the primary system. In response to receiving the host write command, the primary system halts and abandons execution of the comparison process, regardless of its state of completion.

Processing proceeds to operation 210, where the primary system updates the local data block in accordance with the host write command, to create a modified local data block. In the meantime (not shown in flowchart 200A), the host write command has been propagated to the secondary system. In some embodiments of the present invention, it is required that the propagation of the host write command to the secondary system is performed by the primary system. This allows correct sequencing between data chunk comparison and host I/O write processing, and to correctly detect collisions between the two processes.

Processing proceeds to operation 211, where the primary system re-initiates the comparison process.

Processing proceeds to operation 212 where the primary system, as part of the comparison process re-initiated at operation 211, computes a second local hash, this time based on the modified local data block.

Processing proceeds to operation 214, where the primary system composes a hash message and sends the message to the secondary computer system. The hash message includes the hash computed at operation 212, and includes other information that identifies the data block on which the hash was based.

Processing proceeds to operation 216, where the primary system receives a write completion message from the secondary system. The write completion message confirms that the host write command (the same command received at operation 208), was processed successfully at the secondary system, and a remote data block, corresponding to the local data block, has been modified according the host write command, to produce an updated remote data block.

Processing proceeds to operation 218, where the primary system receives a comparison result from the secondary system. The comparison result includes information indicating whether or not the second local hash, which was computed at operation 212, matches a remote hash computed at the secondary system based on the updated remote data block. Note that, however, and whenever, the secondary system received the host write command, the secondary system has processed the host write command before it computed the remote hash.

Processing proceeds to operation 220, where the primary system sends to the requesting system, the comparison result, completing the overall comparison process and having accommodated the colliding host write command.

We turn now to flowchart 200B of FIG. 2B, which describes the same method as described with respect to flowchart 200A, but from the perspective of the secondary system.

Processing begins at operation 222, where the secondary system receives a host write command.

Processing proceeds at operation 224 where the secondary system receives a remote hash message, from a remote system. The remote hash message includes a remote hash, and information identifying a local data block (the local data block being local to the secondary system). Arrival of the hash message informs the secondary system to perform a comparison of the remote hash and a locally computed hash based on the identified local data block. However, having received a host write command at operation 224, and the remote hash message, the secondary system gives priority to the host write command. Therefore, processing proceeds to operation 226 where the identified local data block is modified in accordance with the host write command, to produce an update local data block.

Processing proceeds to operation 228 where the secondary system sends a write completion message to the primary system, confirming that the local data block has been successfully updated in accordance with the host write command.

Processing proceeds to operation 230, where the secondary system reads the updated local data block and computes a local hash based on the updated local data block;

Processing proceeds to operation 232, where the secondary system performs a comparison between the local hash computed at operation 230, and the remote hash received at operation 224. The object of the comparison is to determine a comparison result which indicates whether the local hash is identical to the remote hash.

Processing proceeds to operation 234, where the secondary system composes a message including the comparison result, and sends the comparison result to the remote system.

Figure 3:
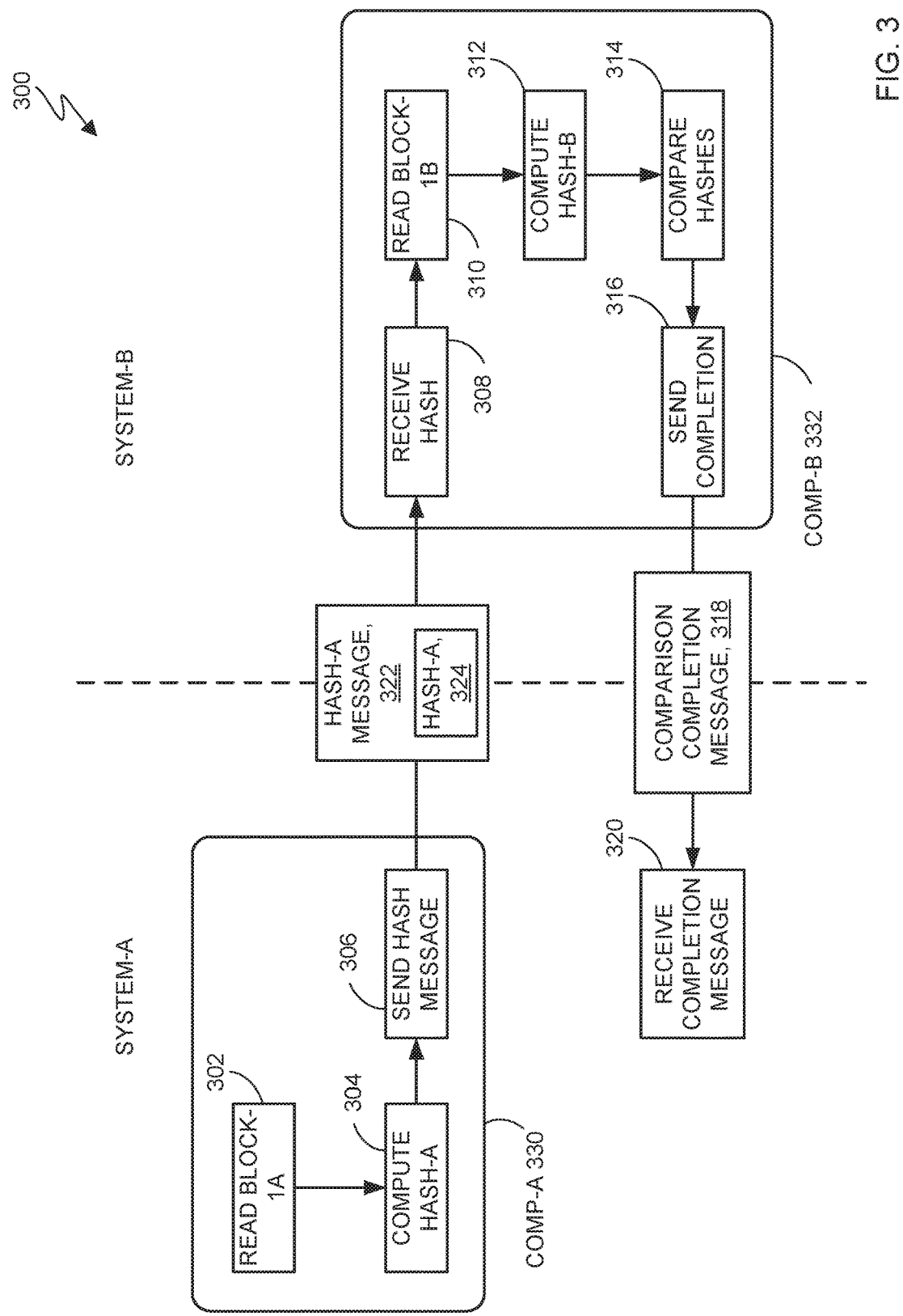
FIG. 3 is a functional block, and data flow diagram depicting a comparison method in accordance with at least one embodiment of the present invention.
Figure 4:
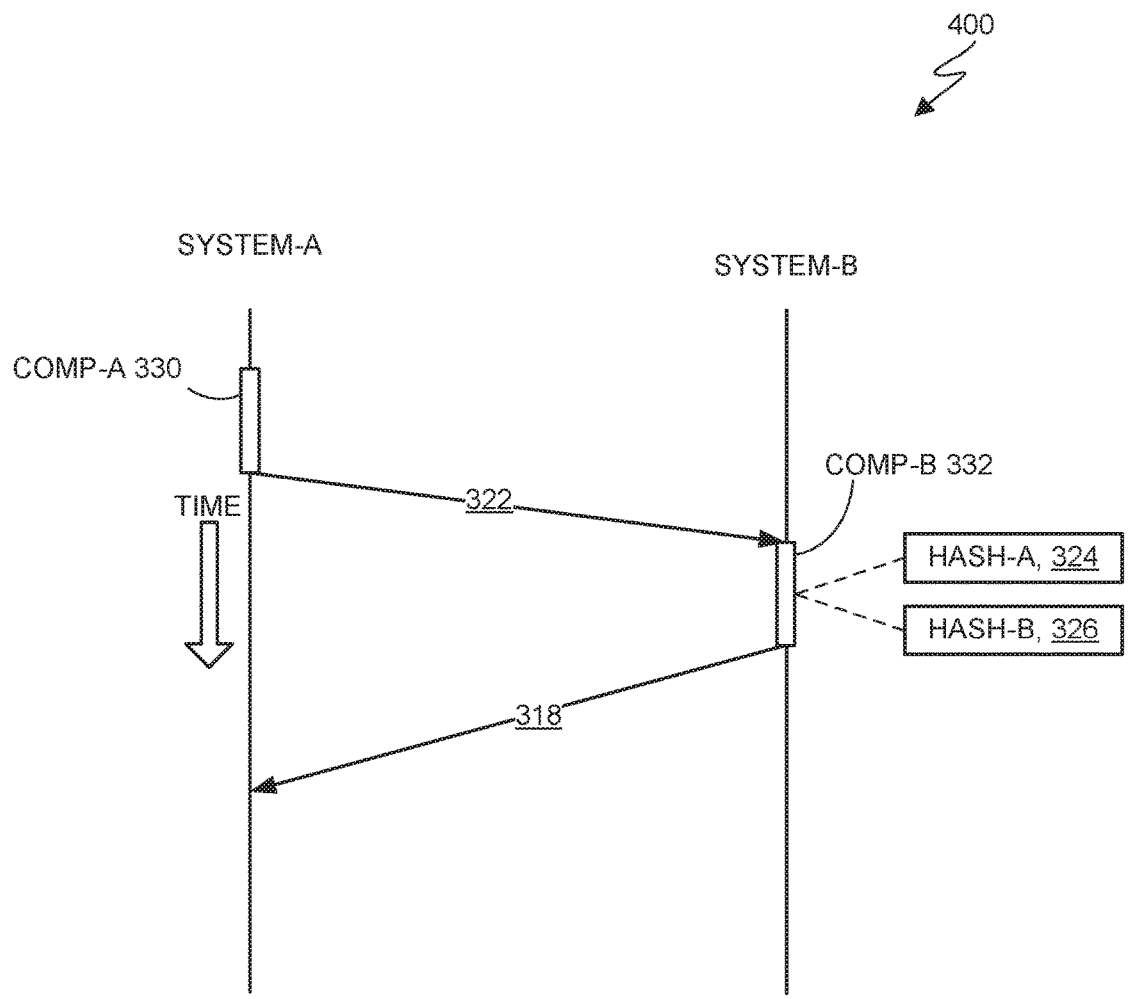
FIG. 4 is a sequence diagram depicting a comparison method in accordance with at least one embodiment of the present invention.

This detailed description now proceeds with reference to FIGS. 3 and 4. Functional block diagram 300 of FIG. 3 show operations performed in some embodiments of the present invention when no collision has taken place. Sequence diagram 400 of FIG. 4 includes the same operations as in FIG. 3, but reformatted and overlaid on a time-based frame of reference.

Referring now to FIG. 3, System-A receives a request from a requestor, to begin a comparison cycle. The request includes information to identify a particular data block (in this example, block-1A, see FIG. 1) to compare with a corresponding data block (for example block-1B, see FIG. 1) on System-B. System-A reads (302) block-1A, and performs a hashing function on block-A1, to compute (304) Hash-A 324. System-A generates and sends (306) Hash-A message 322, including Hash-A 324, to System-B. Hash-A message 322 further includes a header (not shown in the Figures) to identify the volume(s) and logical block addresses (LBAs) that correspond with the System-A copy of the data on which Hash-A 324 is based. System-A operations (read data 302, generate Hash-A 304, and send hash message 306) collectively are referred to in this discussion as Comp-A 330.

System-B receives (308) Hash-A message 322 and derives information from the included header as to which volume(s) and LBAs Hash-A 324 corresponds. System-B reads (310) the corresponding System-B copy of the data block (block 1B) and performs the same hashing function on it, to compute (312) Hash-B 326 (see FIG. 4). System-B compares (314) Hash-A 324 with Hash-B 326. When the comparison is complete, System-B generates and sends (316) comparison completion message 318 to System-A to inform System-A of the comparison result. System-A receives (320) the completion message and forwards the completion message to the requester. System-B operations (308, 310, 312, 314 and 316) collectively are referred to in this discussion as Comp-B 332.

In the event where the hashes are determined to be unequal, subsequent actions taken in response are not within the scope of this paper.

Turning now to FIG. 4, the process depicted in FIG. 3 is re-formatted and overlaid on a time-based reference where time progresses in a downward direction from top to bottom. FIG. 4 includes: System-A; System-B; Hash-A message 322; Comp-A 330; Comp-B 332; Hash-A 324; Hash-B 326; and comparison completion message 318.

In FIG. 4, rectangles representing Comp-A 330, and Comp-B 332 represent time intervals over which the represented operations take place. The solid arrows represent messages (Hash-A message 322, comparison completion message 318) sent between systems. The figure is not drawn to scale. The sizes of the Sys-X-ops rectangles have no physical meaning. The vertical heights of the rectangles simply represent some passage of time during processing of the included operations, but there is no correlation between the magnitude of the vertical heights and the amount of time elapsed during the respective operations.

In the embodiment of FIG. 4, a comparison may be triggered by certain events. For example, the comparison may be triggered on pre-defined schedule, or after completion of a data write cycle, for example. Once a comparison is triggered, System-A performs Comp-A 330, including sending Hash-A message 322, to System-B.

System-B receives Hash-A message 322 which triggers System-B to begin Comp-B 332. System-B compares Hash-A 324 against Hash-B 326. When the comparison is complete, System-B generates and sends comparison completion message 318 to System-A to inform System-A of the comparison result. System-A receives the comparison completion message. System-B operations (308, 310, 312, 314 and 316, FIG. 3) are shown collectively in FIG. 4 as Comp-B 332. In the event where the hashes are determined to be unequal, subsequent actions taken in response are not within the scope of this paper.

Interaction with Host I/Os

Some embodiments of the present invention allow host I/Os to be performed during the comparison process, wherein host I/Os are not significantly delayed by comparison process. In particular, host I/Os not colliding with chunks being compared have the same latency as if there were no ongoing comparison process. Host I/Os that collide with chunks being compared may have an increase in latency, but that increase is significantly less than the round trip time between the systems. As used herein, a "collision" is defined as a host write outstanding from a host system, which addresses an LBA currently being compared in accordance with embodiments of the present invention. The previous section (with reference to FIGS. 3 and 4) addressed the basic case of comparing a chunk with no colliding host I/O.

Some embodiments of the present invention require that messages sent between System-A and System-B are "ordered", meaning that messages are received at the receiving system in the same order as they were sent from the sending system. If received in a different order, the messages are nevertheless processed at the receiving system in the same order as they were sent.

Embodiments of the present invention introduce solutions that deal with collision between host I/Os and chunks being compared, which will now be discussed.

Collision with Host I/O

A collision with a host I/O operation occurs when the host I/O is being submitted to a data chunk in one system while the data chunk is being compared against a corresponding data chunk in another system. Depending on the type of I/O operation that collides with the comparison process, there are (at least) two possible scenarios: (i) the I/O operation is a READ operation; or (ii) the I/O operation is a write operation. Because a READ operation does not modify the data being read (for example, data on back-end storage), there is no problem with reading a data chunk while the chunk is being compared.

A host write operation modifies the data. Modifying the data also means a hash computed from the modified data will be different than a hash computed from the data before it was modified. There are at least four different scenarios for collision between a comparison operation and a host write as follows: (i) a host write command is received at System-A and collides with Comp-A 330; (ii) a host write command is received at System-A, propagates to System-B, and collides with Comp-B 332; (iii) System-B receives a host write command then receives Hash-A 324; and (iv) System-B receives a host write command, while Comp-B 332 is in progress. Each of the scenarios will be discussed below.

It is noted that while examples of hash algorithms that may be used in some embodiments of the present invention include SHA-1 and MD5 algorithms, other hash algorithms (such as cryptographically useful ones and non-cryptographically useful ones) may be used.

To solve the issues brought about by collisions, some embodiments of the present invention keep track of which data chunks are being compared (see the section Keeping track of progress and detecting collision, below). When there is a host write taking place, each system detects a collision and takes appropriate action. To avoid adversely impacting host I/Os, some embodiments of the present invention perform host writes immediately after the write commands are submitted (that is, received at the respective systems). If a collision is detected, any ongoing comparison process for the affected data chunk is stopped and restarted, which may delay the comparison, but avoids impacting the host write.

Scenario 1: Host Write Originates at System-A and Collides with Comp-A.

Figure 5A:
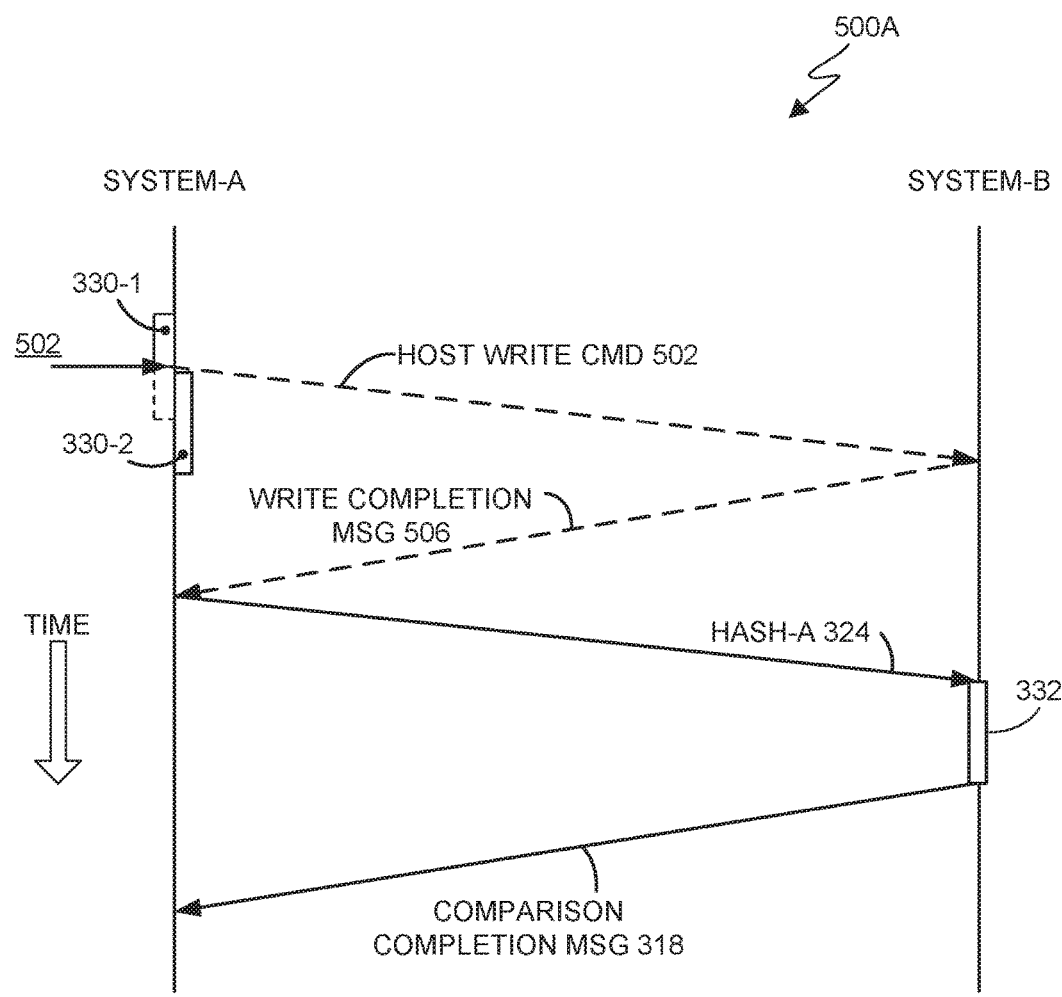
FIG. 5A is a sequence diagram depicting a first collision scenario handling method in accordance with at least one embodiment of the present invention.
Figure 5B:
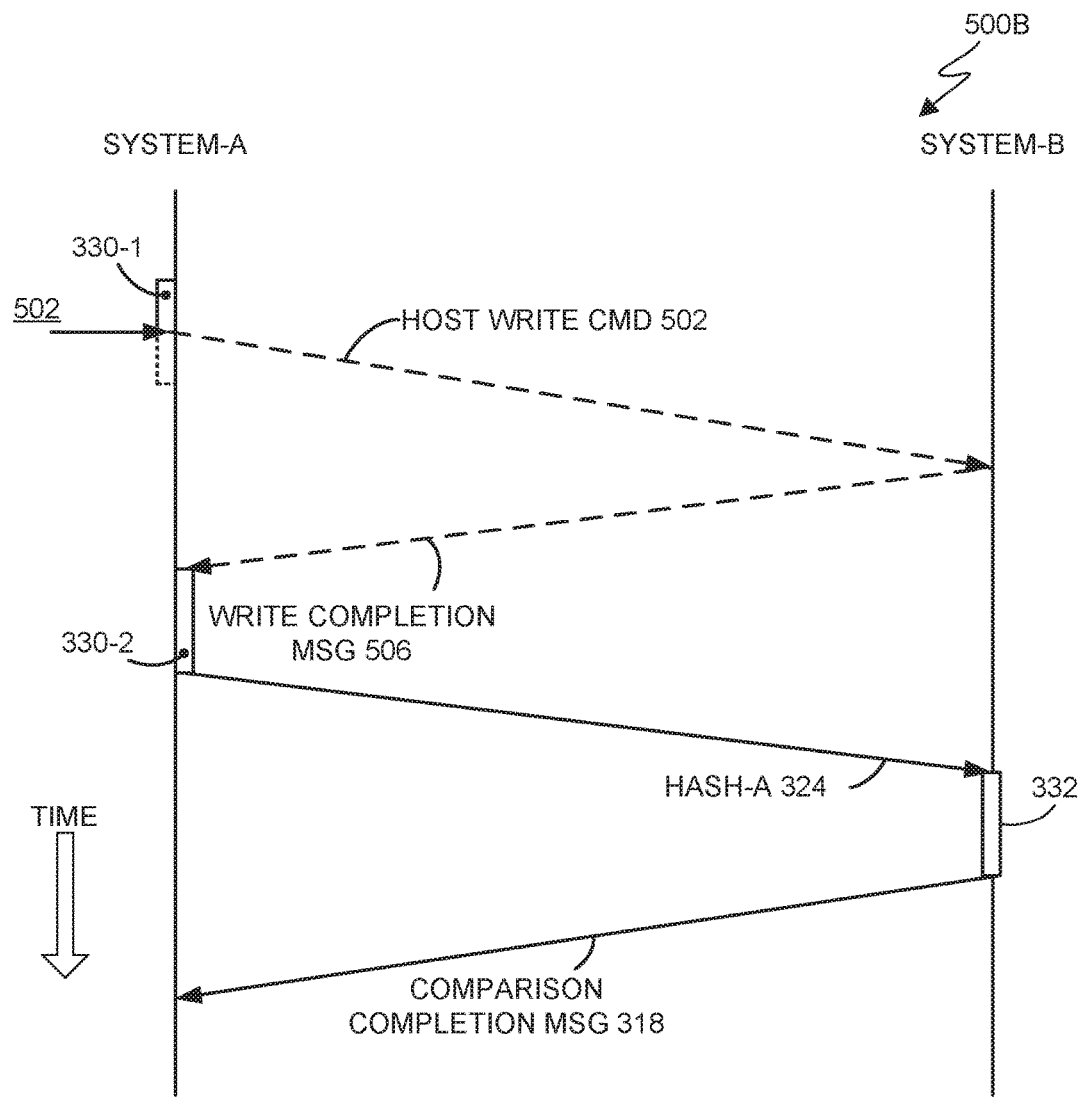
FIG. 5B is a sequence diagram depicting an alternate first collision scenario handling method in accordance with at least one embodiment of the present invention.

As shown in sequence diagram 500A of FIG. 5A, host write command 502 directed against a data chunk, is received at System-A and collides with a first attempt at Comp-A 330 (which is shown in FIG. 5A as 330-1) already in progress. System-A detects the occurrence of this collision, in response to which System-A, without regard as to how far along the Comp-A has progressed, stops (and subsequently restarts) the Comp-A for the affected data block. More specifically, when System-A receives host write command 502, System-A performs the following actions: (i) processes host write command 502 as write I/Os are normally processed, to update the data block; (ii) detects the collision; (iii) cancels the first attempt at Comp-A 330-1, for the affected data chunk; (iv) forwards host write command 502 to System-B; (v) starts a second attempt at Comp-A 330, which is shown in the Figure as 330-2, and which includes generating Hash-A 324, based on the new data; (vi) receives comparison completion message 318; and (vii) sends Hash-A 324 to System-B. Alternatively, in some embodiments of the present invention, System-A defers sending of Hash-A 324 to System-B until System-A receives write completion message 506 from System-B and only after receiving the write completion message does System-A send Hash-A 324-2 to System-B. This alternative, while it may result in increased processing time but a simpler implementation, is shown in sequence diagram 500B of FIG. 5B.

Once Comp-A 330-2 is complete and System-A has received write completion message 506, System-A sends Hash-A 324 to System-B. In response, System-B performs its part of the comparison process (Comp-B 332), and returns comparison completion message 318 to System-A.

A subsequent collision between a host write and the comparison process (in this or any other scenario of the four scenarios discussed herein) would ordinarily drive the comparison process to start yet again. The section "Continuous collision between a chunk comparison and host I/Os" below addresses how some embodiments of the present invention make progress with the comparison process to break out of a potentially continuous collision.

Scenario 2: Host Write Originates at System-A, Propagates to System-B, Collides with Comp-B.

Figure 6:
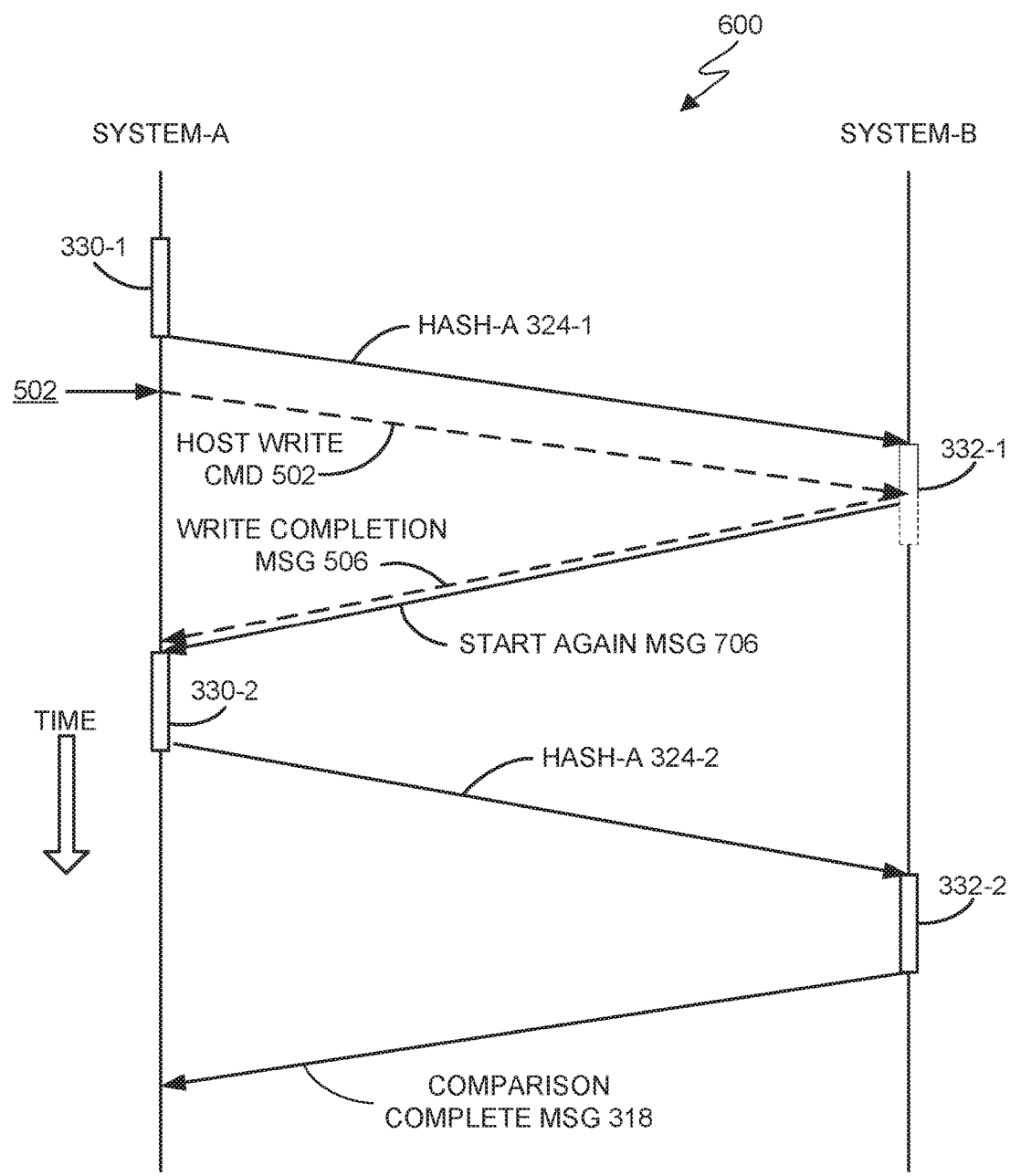
FIG. 6 is a sequence diagram depicting a second collision scenario handling method in accordance with at least one embodiment of the present invention.

Scenario 2 will now be discussed with reference to sequence diagram 600 of FIG. 6. In scenario 2, System-A performs a first iteration of Comp-A 330 (shown in the Figure as 330-1) to determine a first iteration of Hash-A 324 (shown in the Figure as 324-1) corresponding to a data chunk that is to be compared to the corresponding copy of the data on System-B. System-A sends Hash-A 324-1 to System-B, where in response, System-B begins its part of the comparison process, a first attempt at Comp-B 332 (shown in the Figure as 332-1). System-A then receives host write command 502 which is to be applied to the data chunk for which Hash-A 324-1 has already been determined. If Comp-A 330 completes while no host write 502 is received by System-A for the data chunk for which Hash-A 324-1 has already been determined, there is no collision between the write and the comparison process and each may be processed as normal. If host write command 502 is received while System-A is processing Comp-A 330, then System-A processes host write command 502 (updating its copy of the data), and forwards (propagates) the host write command to System-B. System-B receives the host write command which collides with the ongoing processing of the first attempt at Comp-B 332 (shown in the Figure as 332-1).

Both systems are able to detect the collision. However, as Hash-A 324-1 from System-A is already outstanding (meaning System-A has not yet received a corresponding comparison completion message), System-A does not yet preempt, re-start, or stop the comparison process. Thus System-B has the responsibility to take action.

When System-A reads the data chunk and computes Hash-A 324-1 in this scenario, it does so before it applies the host write command 502. Hash-A 324-1 therefore is based on old data. However for System-B, there is no guarantee that System-B will read the data chunk for comparison before or after host write command 502 is applied. Thus the System-B hash may be different from the System-A hash because the System-B hash could be based on new data while the System-A hash is based on old data, meaning the comparison might yield an incorrect result.

System-B responds to the collision by performing the following actions. In response to detecting the collision System-B interrupts the first iteration of the comparison process Comp-B 332 (shown in FIG. 6 as 332-1). The not-completed first iteration of Comp-B 332 is shown in FIG. 6 as 332-1. The comparison process may be interrupted at any stage of completion, depending on when the host write command arrives relative to the progression of Comp-B 332-1. The host write command is given priority over the comparison process, to avoid impacting the performance (avoid increased latency and/or reduced I/O throughput) of the host write command. Any outstanding read operation for Comp-B 332 will not impact the correctness of the host write Command.

In further response to detecting the collision, System-B sends to System-A: (i) start again message 706 to let System-A know that System-B has detected the collision and that System-A has to restart the comparison of the affected data chunk; and (ii) write completion message 506, to indicate that host write command has been completed at System-B. At this time, System-A has already applied host write command 502. On receiving the start again message, System-A starts a second iteration of Comp-A 330 (shown in the Figure as 330-2) which now is based on the updated data. Receiving both messages (write completion message 506 and start again message 706) by System-A ensures that host write command 502 has been applied to both copies (the System-A and System-B copies) of the data.

If System-A were to start processing the chunk again as soon as one message (write completion message 506, or start again message 706) reaches System-A the following two undesirable consequences could result:

Consequence 1: If System-A receives write completion message 506 before it receives send again message 706, System-A can deduce that System-B saw a collision, because System-A received the write completion message in response to something that System-A sent (host write 502) after something else that it sent (Hash-A message 322). In other words, System-A would receive the responses (write completion message 506, and start again message 706) out of the order they would have been expected to be received. It would be unwise for System-A to start the second iteration (330-2) to process the data chunk again, in case System-B has not finished cancelling its first iteration (332-1) processing of the chunk. In this case, if System-B receives the new hash message from System-A, it can lead to an invalid comparison.

Consequence 2: If System-A receives start again message 706 before it receives write completion message 506, System-A can directly deduce that System-B saw a collision. Again, it would be unwise to start processing the grain (data chunk) again because a new Hash-A 330-2 could reach System-B before System-B is done processing the host write (because of high latency for instance). Thus when System-B receives the System-A hash, it will detect a collision described in scenario 4 (discussed below in the section "Collision with host write: scenario 4").

Figure 7:
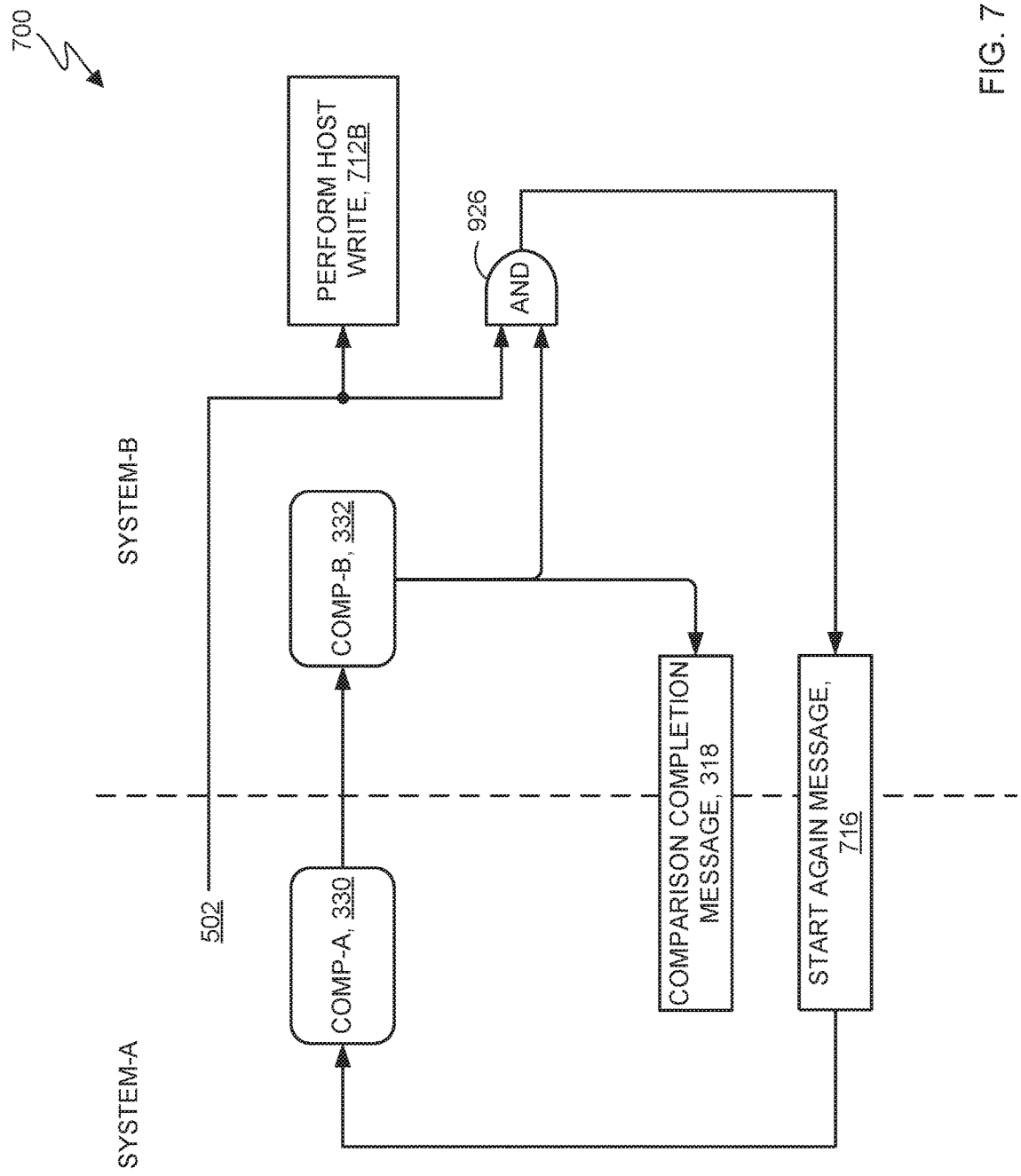
FIG. 7 is a functional block, and data flow diagram depicting a second collision scenario handling method in accordance with at least one embodiment of the present invention.

The method of scenario 2 discussed above is shown as functional block diagram 700 of FIG. 7. System-A is triggered by a comparison command (not shown in FIG. 7) to compare a data chunk on System-A with the corresponding copy of the data chunk on System-B. In response, System-A performs Comp-A 330, to generate Hash-A 324 (not shown in FIG. 7) based on the data chunk. System-A sends Hash-A 324 to System-B. System-B receives the Hash-A message and, in response, begins to process Comp-B 332. Meanwhile, System-B receives host write command 502, while Comp-B 332 is still in process, thereby resulting in a collision.

System-B detects (926) the collision, which is a logical AND condition where Comp-B 332 is in progress AND (926) host write command 512 is outstanding. In response, System-B performs the following actions: (i) updates the data chunk (712B) according to host write command 512; (ii) sends write completion message (706) to System-A (the remainder of this method will consider the case where host write command 502 is sent from System-A); (iii) stops Comp-B 332, regardless of the stage of completion of Comp-B 332; and (iv) sends start again message 716 to System-A.

If there had been no collision (that is, if System-B does not receive host write command 502 while processing Comp-B 332), Comp-B 332 would complete normally, concluding with sending to System-A comparison completion message 318.

Scenario 3: System-B Receives Host Write then Receives Hash-A.

Figure 8:
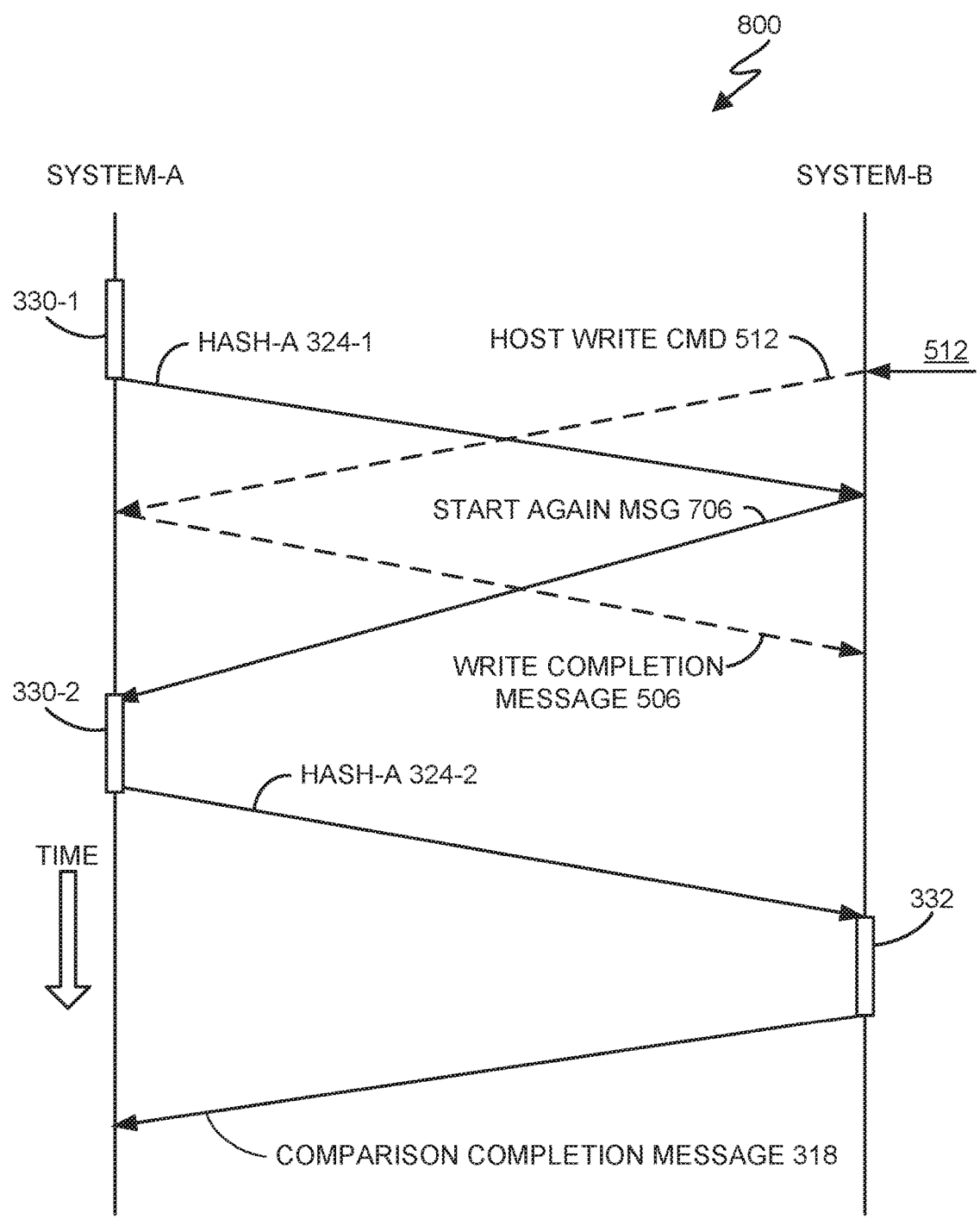
FIG. 8 is a sequence diagram depicting a third collision scenario handling method in accordance with at least one embodiment of the present invention.

Scenario 3 will now be discussed with reference to sequence diagram 800 of FIG. 8. System-A receives a signal (not shown in the Figures) directed to comparing a data chunk on System-A with a corresponding data chunk on System-B. In response, System-A initiates a first iteration of Comp-A 330 (shown in FIG. 8 as 330-1), at the completion of which System-A sends a first iteration of Hash-A 324 (shown in the Figure as 324-1) to System-B. At some time before System-B receives Hash-A 324-1, System-B receives host write command 512. System-B performs the host write operation in accordance with the host write command and forwards the host write command to System-A for replication at System-A.

Note: In the embodiment of FIG. 8, host write command 512, having been received first at System-B, replicates in a direction (from System-B to System-A) which happens to be opposite to the direction of the comparison process, which progresses from System-A to System-B.

When System-A receives host write command 512, before receiving comparison completion message 318, it knows there has been a collision at System-B. System-B knows there is a collision when it receives a first iteration of Hash-A 324 (shown in FIG. 8 as 324-1) after System-B has sent host write command 512 to System-A but before System-B receives write completion message 506 from System-A.

System-A applies host write command 512 to its own copy of the data and returns write completion message 506 to System-B. When System-B receives Hash-A 324-1 (now based on obsolete data) from System-A, System-B ignores (and/or discards) Hash-A 324-1, and sends start again message 706 to System-A. System-A receives the start again message, and begins a second iteration of Comp-A 330 (shown in FIG. 8 as 330-2). At completion of Comp-A 330-2, System-A sends a second iteration of hash 324 (shown in the Figure as 324-2) which is now based on up-to-date data, to System-B. On receiving Hash-A 324-2, System-B performs Comp-B 332, to perform the remainder of the comparison process, and returns comparison completion message 318 to System-A.

Scenario 4: System-B Receives Host Write Command, While Comp-B is in Progress.

Scenario 4 will now be discussed with reference to sequence diagram 900A of FIG. 9A. System-A receives a signal (not shown in the Figures) directing comparison of a data chunk on System-A with a corresponding data chunk on System-B. In response, System-A initiates a first iteration of Comp-A 330 (shown in FIG. 9A as 330-1), at the completion of which System-A sends a first iteration of Hash-A 324 (shown in the Figure as 324-1) to System-B. System-B, in response to receiving Hash-A 324-1, starts processing a first iteration of Comp-B 332 (shown in FIG. 9A as 332-1). Before completing Comp-B 332-1, System-B receives host write command 512. The host write command collides with Comp-B 332-1.

A host write command is generally given a higher priority than the comparison process, to avoid adverse impact to 110 performance caused by the comparison process. In response to the collision, System-B performs the following actions: (i) applies host write command 512 to update the System-B copy of the data chunk; (ii) cancels Comp-B 332-1; (iii) sends the host write command to System-A for replication at System-A; and (iv) sends start again message 706 to System-A (only after sending the host write command to System-A) to inform System-A that there has been a collision. In response, System-A processes the host write command, then restarts the comparison process, Comp A 330 (shown in the Figure as 330-2).

When System-A receives host write command 512, it updates the System-A copy of the data chunk and returns write completion message 506 to System-B. Start again message 706 triggers System-A to start a second iteration of Comp-A 330 (shown in FIG. 9A as 330-2).

Optimization of Scenario 4

In some embodiments of the present invention, the handling of scenario 4 is optimized, as will now be discussed with reference to sequence diagram 900B of FIG. 9B and functional block diagram 900C of FIG. 9C.

System-A receives a signal (not shown in the Figures) from a requestor (not shown in the Figures) directing that a comparison of a data chunk on System-A and a corresponding data chunk on System-B be undertaken. In response, System-A initiates a first iteration of Comp-A 330 (shown in FIG. 9B as 330-1), at the completion of which System-A sends a first iteration of Hash-A 324 (shown in FIG. 9B as 324-1) to System-B. System-B, in response to receiving Hash-A 324-1, starts processing Comp-B 332. Before completing Comp-B 332, System-B receives host write command 512 which collides with Comp-B 332.

In some embodiments of the present invention, a host write command is given a higher priority than the comparison process, to avoid adverse impact to I/O performance caused by the comparison process. In response to detecting the collision, System-B performs the following actions: (i) processes host write command 512 to produce an updated System-B copy of the data chunk; (ii) stops processing Comp-B 332, regardless of its state of completion; (iii) propagates the host Write command to System-A; (iv) begins the System-B portion of the comparison process again, this time as Comp-B-combined 934; and (v) sends combined message 922 to System-A. In response to receiving host write command 512, System-A applies the host write command to the System-A copy of the data chunk to produce an updated System-A copy of the data chunk, and sends write completion message 506 to System-B.

Further to items (iv) and (v) in the paragraph above, Comp-B-combined 934 includes the following operations performed by System-B: (i) reads the updated System-B copy of the data chunk; (ii) computes a hash of the data chunk to produce Hash-B 326; and (iii) generates combined message 922 where the combined message includes Hash-B 326 and start again message 716 (see FIG. 7).

In response to receiving combined message 922, System-A performs a second iteration of Comp-A 330 (shown in FIG. 9B as 330-2), which includes the following operations performed by System-A: (i) reads the updated System-A copy of the data chunk; (ii) computes Hash-A 324 of the updated System-A copy of the data chunk; and (iii) compares Hash-A 324 against Hash-B 326 to produce a comparison result (not shown in the Figures).

Figure 9A:
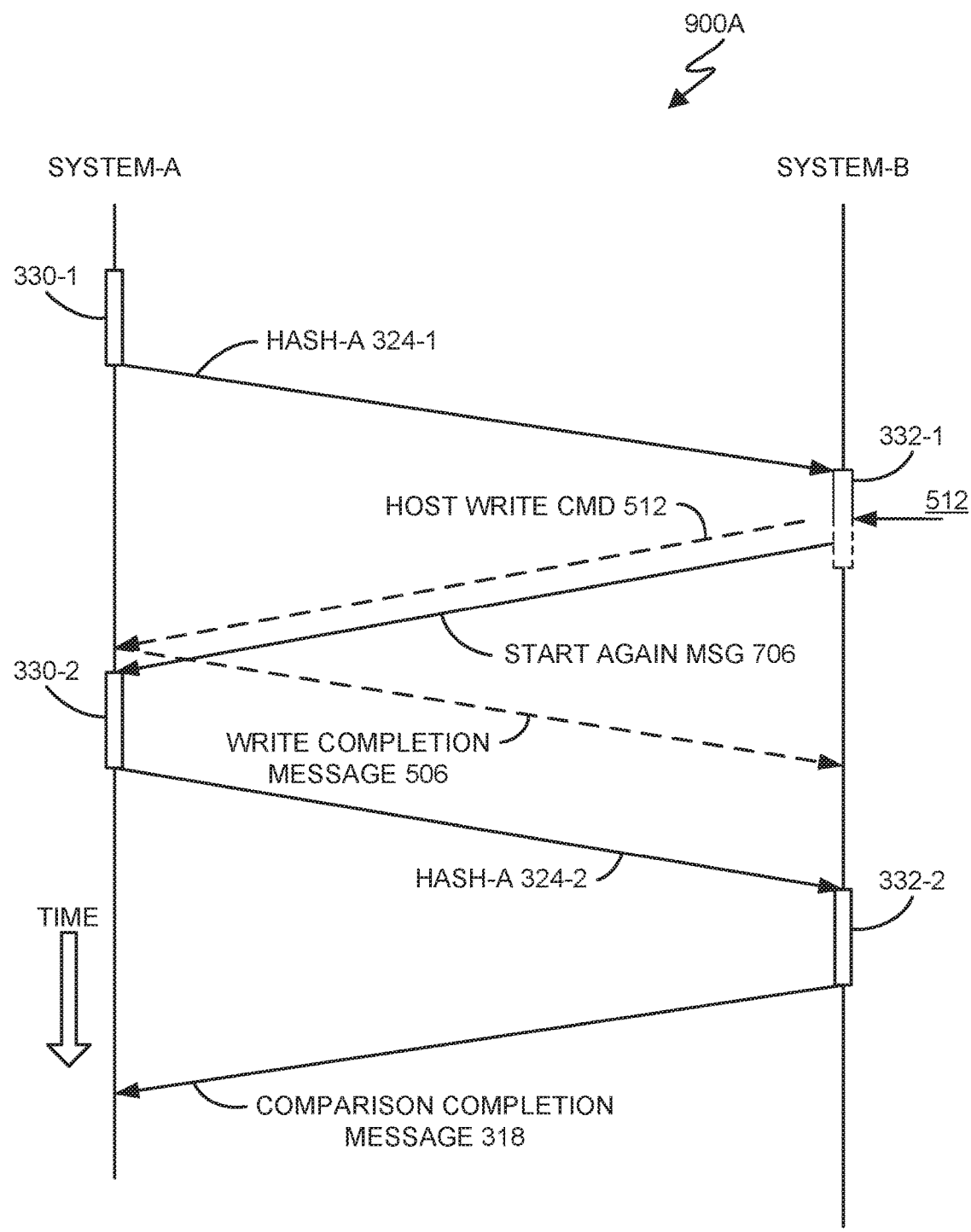
FIG. 9A is a sequence diagram depicting a fourth collision scenario handling method in accordance with at least one embodiment of the present invention.
Figure 9B:
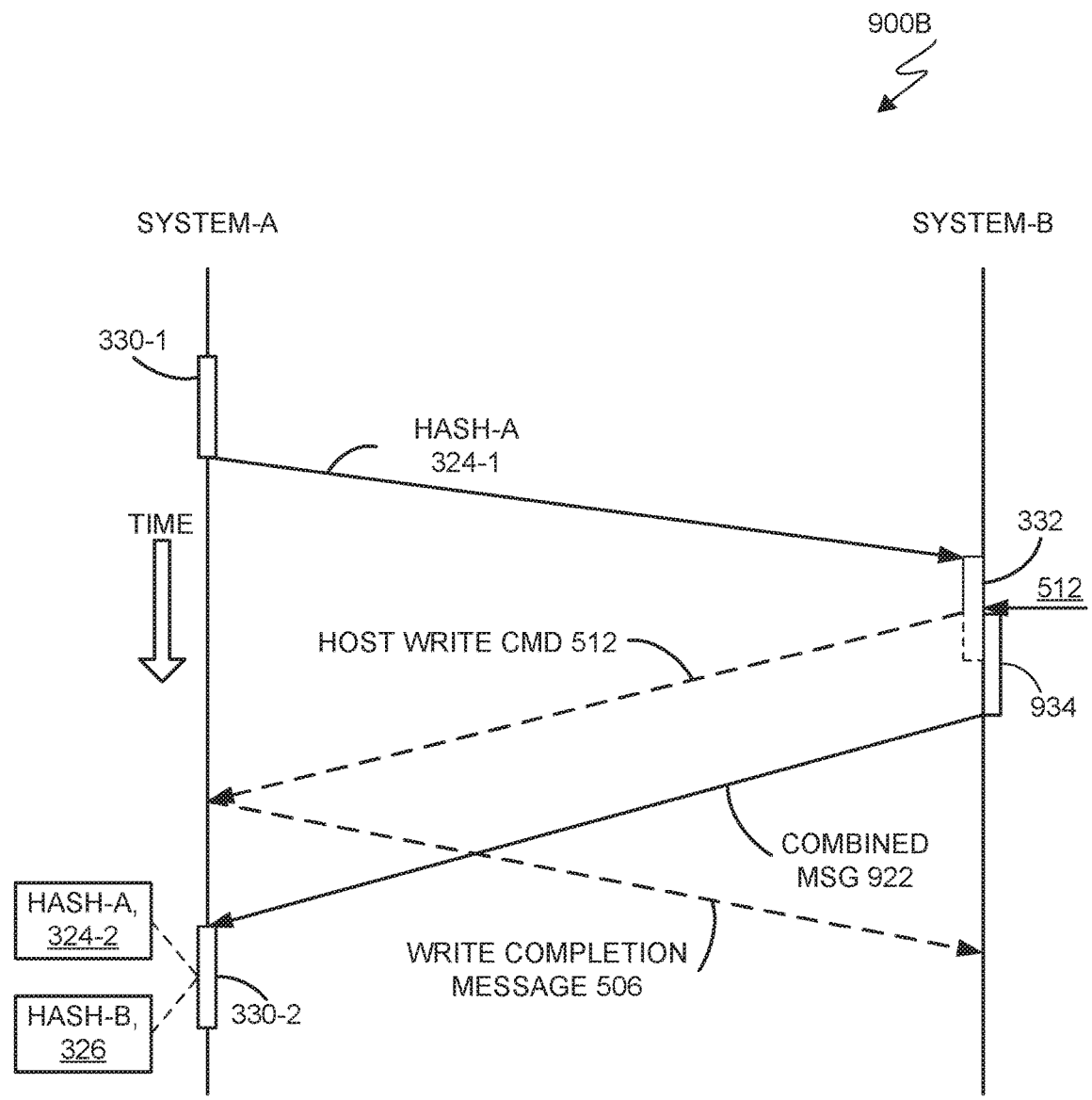
FIG. 9B is a sequence diagram depicting an alternate fourth collision scenario handling method in accordance with at least one embodiment of the present invention.

In compact terms, in embodiments depicted in FIG. 9B, System-B assumes the role of "pseudo-lead" of the comparison process. System-A, having received combined message 922 (including "start again" message and Hash-B 326) knows it has to act as a pseudo-follower for the corresponding data chunk. System-A, having already applied the host write command, reads the updated data, hashes it and compares the hashes to complete the comparison.

Note that in the embodiment of FIG. 9B, systems A and B exchange two messages (324-1 and 922) with respect to the comparison process (which is exactly as many message as there would have been in the absence of a collision), as opposed to four (324-1, 706, 324-2, and 318) in the embodiment of FIG. 9A.

Some embodiments of the present invention, including embodiments depicted in FIG. 9B, may include one, or more, of the following features, characteristics and/or advantages: (i) reduces bandwidth usage compared to some embodiments (such as embodiments depicted in FIG. 9A); (ii) reduces the workload on each system (fewer hash operations); (iii) reduces the combined total computing time consumed in hashing both copies of a data chunk; and (iv) frees up resources sooner, so they can be reused (for example, to hash the next data chunk).

The scenario of FIG. 9B is re-formatted and expanded (to show more detail) and shown as functional block diagram 900C of FIG. 9C. System-A receives a signal (not shown in the Figures) from a requestor (not shown in the Figures) requesting that an operation be performed to compare a data chunk on System-A against a corresponding data chunk on System-B. In response, System-A performs the following operations: (i) reads (302-1) the System-A copy of the data chunk; (ii) performs a first iteration of compute Hash-A 201 (shown in FIG. 9C as 304-1) to produce a first iteration of Hash-A 324 (shown in FIG. 9C as 324-1); and (iii) sends Hash-A, 324-1 to System-B.

In response to receiving Hash-A 324-1, System-B begins a first iteration of the System-B portion of the comparison process (Comp-B 332), which includes operations: receive hash, 308; first iteration of read System-B data 310 (shown in the Figure as 310-1); first iteration of generate Hash-B 312 (shown in the Figure as 312-1); compare hashes 314; and send completion message 316. Before completing Comp-B 332, System-B receives host write command 512 which collides with Comp-B 332.

In some embodiments of the present invention, host write command 512 is given a higher priority than the comparison process, to avoid adverse impact to I/O performance caused by the comparison process. In response to detecting the collision (logical AND 926, both inputs active), System-B performs the following operations: (i) stops processing Comp-B 332, regardless of its state of completion (932); (ii) processes (712B) host write command 512 to produce an updated System-B copy of the data chunk; (iii) sends ("A" connector) host write command 512 to System-A; (iv) (only after performing 712B) begins a second iteration of the System-B portion of the comparison process, this time as Comp-B-combined 934; and (v) sends ("B" connector) combined message 922 to System-A. Further to items (iv) and (v) above, Comp-B-combined 934 includes the following operations performed by System-B: (i) reads (310-2) the updated System-B copy of the data chunk; (ii) computes (312-2) a hash of the data chunk to produce Hash-B 326; and (iii) generates (920) combined message 922 where the combined message includes Hash-B 326 and start again message 716.

In response to receiving host write command 512, System-A applies (712A) the host write command to the System-A copy of the data chunk to produce an updated System-A copy of the data chunk, and sends write completion message 506 to System-B (see FIG. 9B).

In response to receiving combined message 922, System-A, and only after having performed host write command 712A (logical AND operation 824), performs the following operations: (i) reads (302-2) the updated System-A copy of the data chunk; (ii) computes (304-2) Hash-A 324 (see FIG. 9B) of the updated System-A copy of the data chunk; and (iii) compares Hash-A 324 against Hash-B 326 (see FIG. 9B) to produce a comparison result (not shown in the Figures).

Keeping Track of Progress and Detecting Collisions

Some embodiments of the present invention perform comparison of many data chunks in parallel and/or serially, to effect a comparison of a large data file, for example of gigabyte or even multi-terabyte proportions. For example, using data chunks of 8 kilobytes each, in processing a 1 terabyte file, would potentially involve $125 \times 10^6$ data chunks. To keep track of the progress of such a comparison process, and to decide which data chunk to compare next, all the while avoiding interference with any number of write operations scattered throughout millions of data chunks of the volume, System-A stores a "high-water" mark. This high-water mark points to an index of a data chunk to process. The high-water mark is initialized to 0 when a comparison process starts and it is incremented every time System-A decides to process another chunk.

Some embodiments of the present invention require that System-A and System-B can easily detect collisions between host writes and the comparison process. Any method now known, or to be developed in the future, can be used in this regard.

Decreased Bandwidth Requirements

Some embodiments of the present invention do not send whole data blocks but only hashes derived therefrom. For example, the SHA-1 algorithm is used to compute 20 Byte hashes from data chunks of 8 KB. This yields a transmitted data ratio (data block size: hash size) of approximately 400:1. With a 400:1 ratio, a volume of 1 TB need send only 2.5 GB of data (hashes) for comparison. Some embodiments of the present invention may include one, or more, of the following features, characteristics and/or advantages: (i) using less bandwidth means comparing hashes is less expensive in terms of computing resources (less network traffic, fewer processing cycles, etc.) than comparing the data itself, leaving available more bandwidth for host 110, for example; (ii) computing and sending hashes may be faster as compared to sending the data itself; and/or (iii) comparisons, especially of large files, may be completed sooner.

Choosing the Hashing Algorithm

Choosing a hashing algorithm for use in some embodiments of the present invention includes at least the following considerations: (i) collision rate; (ii) collision resistance; (iii) resistance to attack; (iv) avalanche effect; and/or (v) computational speed. These considerations are discussed in the following few paragraphs. Note here that in the context of choosing a hashing algorithm, the term collision refers to an occurrence where two different chunks of data yield matching hashes. In other words, a hashing collision occurs when two different inputs to the hashing algorithm yield the same (hash) output. This usage of "collision" is not to be confused with a collision between a comparison operation and a write command as discussed in other sections throughout this paper.

In some embodiments of the present invention, System-A and System-B may coordinate the choice of hashing algorithm through various methods including the following possible methods: (i) a single algorithm is used and shared by both systems; (ii) a configuration setting dictates to both systems which hashing algorithm to use in any given instance (different hashing algorithms may be used in different circumstances); (iii) a setting is communicated between the systems through an out-of-band message (not considered herein); and/or (iv) information is included in each a hash message (being sent from one system to the other) to describe the hashing algorithm used for the hash therein.

Consideration: Collision rate. A hashing algorithm is chosen and used here as a "fingerprint", or a "proxy" of the data, which enables a reduction in the amount of data that is transmitted and compared. Thus, provided that a chosen hashing algorithm does not have an unacceptably high collision rate, any hashing algorithm may be suitable. The choice of a hashing algorithm may be generally based primarily on the size of the data chunks and the desired compression ratio.

Consideration: Collision resistance. Another aspect in choosing a hashing algorithm is strong collision resistance, such that the possibility of two chunks with different data having matching hashes is acceptably remote. The SHA-1 algorithm offers good collision resistance, such that data corruption (any differences between the two data chunks being compared) is overwhelmingly likely to be detected.

Consideration: Resistance to attack. Still another aspect in choosing a hashing algorithm is its resistance to certain attacks (such as a pre-image attack) to prevent a malicious user from writing data to one copy designed to give the same hash as data currently on the other copy, which if successful, may defeat the ability of some embodiments of the present invention to detect differences. In such an environment, SHA-1 may be insufficient, and SHA-256 or other hashes may be preferred.

Consideration: Avalanche effect. One aspect of the avalanche effect means that certain kinds of transmission errors are much easier to detect as compared to detecting the those kinds of errors when sending the raw data. Hashing algorithms with an avalanche effect should be chosen. In practice, all real-world cryptographic hashes may offer the avalanche effect, wherein if an input is changed even slightly, the output changes significantly (for example, flipping a single bit in the input causes approximately half the output bits to flip).

Consideration: Computational speed. This consideration may involve determining whether the hashing algorithm is sufficiently fast using the available hardware. For example, SHA-256 is significantly slower than SHA-1, which could make SHA-256 inappropriate if the desired rate of data comparison exceeds the rate at which SHA-256 hashes can be generated, whereas SHA-1 might be appropriate. More computationally complex hashing algorithms may become feasible if faster hardware or hardware acceleration is used.

Some embodiments of the present invention may include one, or more, of the following features, characteristics and/or advantages: (i) provides a new way to compare two volumes in an active-active, or active-passive relationship; (ii) does not impact replication of writes to both copies in an active-active, or active-passive relationship while performing comparison of the copies to each other; (iii) enables local pass-through reads; (iv) keeps both copies of the data identical; (v) enables comparison of the data copies in an active-active, or active-passive relationship without quiescing host I/Os or even impacting them; (vi) make use of hashes to compare data instead of comparing data directly while bringing about a significant reduction in the amount of bandwidth used to perform a comparison; (vii) brings about a significant reduction in the amount of memory required to perform a comparison; (viii) brings about a significant reduction in the time needed to complete a comparison process; and (ix) provides a solution to different types of collisions between host writes and data chunks being compared, assuming the necessary condition that messages sent by the two systems are ordered (that is, messages are received in the same order as they were sent, or if received in a different order, are nevertheless processed at the receiving system in the same order as they were sent from the sending system). Some embodiments may not have these potential advantages and these potential advantages are not necessarily required of all embodiments.

Some embodiments of the present invention may include some or all the following extensions: (i) recording differences and capturing data; (ii) context-based optimization; (iii) quiescing host I/O activity or queueing host I/O commands, to speed up comparison; and (iv) handling continuous collision between a data chunk comparison and a stream of host I/O commands. These extensions are discussed in the following few paragraphs.

Recording differences—Capturing data: detects the difference and captures the discrepant data when there is a difference between the copies. Recording differences is done by using a bitmap and a counter. The bitmap has a bit respectively corresponding to each data chunk of the volume under observation. Every time a chunk is compared, a corresponding bit in the bitmap is updated with the result of the comparison: for example, the bit is set to 0 if both copies have an identical chunk; and set to 1 otherwise. The counter keeps track of the number of chunks that have been processed. The counter is updated every time a bit in the bitmap is updated. The comparison process is complete when this counter reaches the number of chunks in the volume.

In some embodiments of the present invention, using the aforementioned bitmap, data chunks are captured when the respective copies are different. For example, when System-B detects a difference, it stores its own copy of the data chunk and when System-A updates the bitmap with the corresponding 1, it also stores its own copy of the data chunk. This mechanism creates a database of the chunks with differences that can be investigated to understand the cause of the differences.

Context based optimization: There are at least two different use cases that can benefit from some embodiments of the present invention: (i) when a full volume integrity check has to be performed; and (ii) when the focus is on particular regions of the volume. The difference between these two use cases lies in how System-A decides which chunk to process next.

Full volume integrity. A user wants to ensure that both copies of a volume are exactly identical, and so a full standard comparison is performed: a high-water mark counter is initialized to 0 and incremented every time System-A decides to process another grain (data chunk). Similarly, the counter is incremented every time a chunk updates its bit in the bitmap. The user will be notified of the end of the comparison process when the counter reaches the number of data chunks in the volume.

Focusing on particular regions of a volume. A user may want to ensure that a given region of a volume is identical in both copies. This region can be contiguous or not, and large or small. Some reasons for focusing on a particular region include: (i) the user wants to focus on the most active region of the volume; (ii) the user may want to define a region with critical data to ensure the respective copies remain identical during production; and (iii) the user may want to ensure that recently written regions were updated with the same data.

Figure 10:
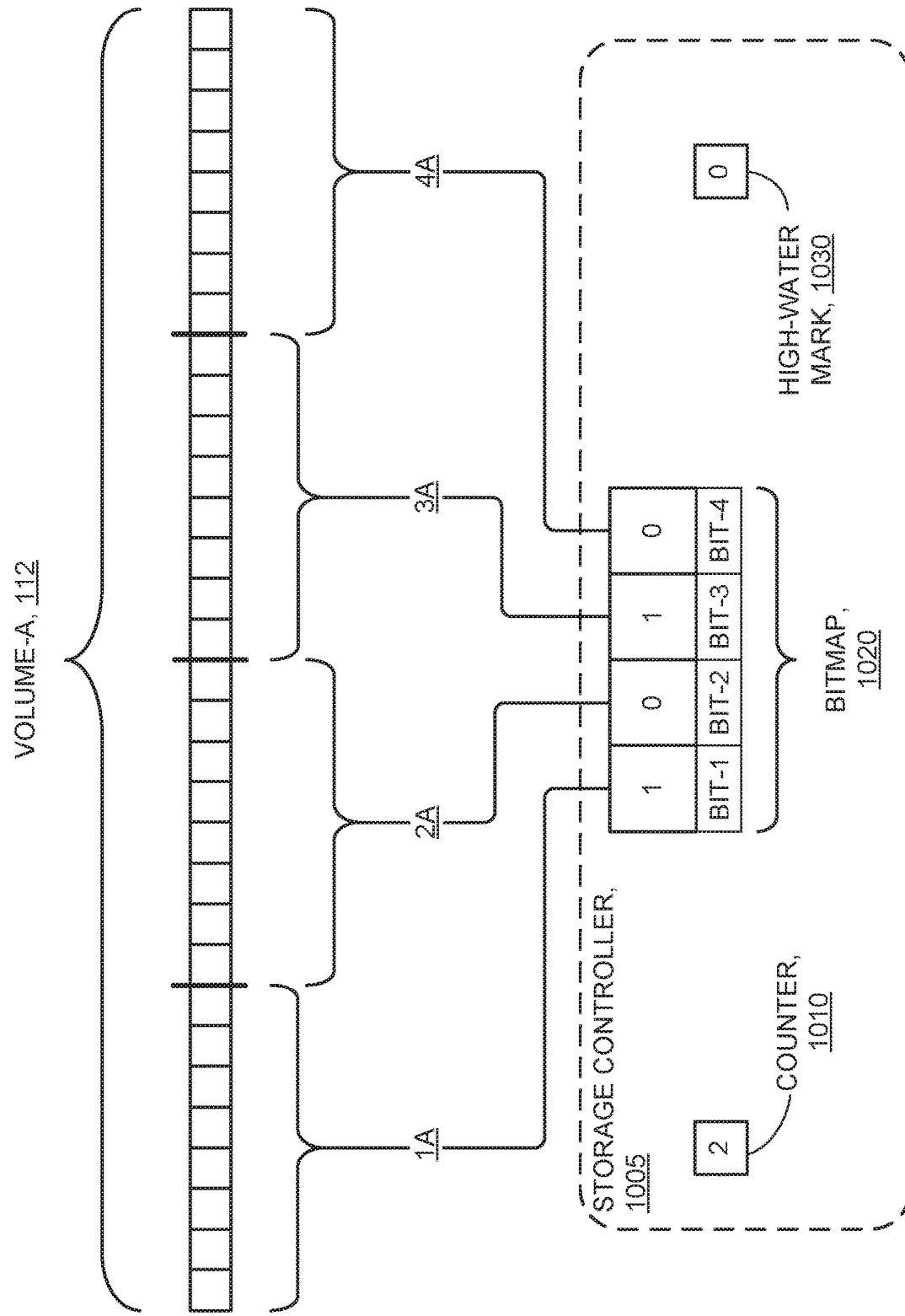
FIG. 10 is a block diagram depicting example storage areas in a method in accordance with at least one embodiment of the present invention.

Referring now to FIG. 10 by way of example, a region of data in volume-A 112 has been marked as important and only this region has to be compared. Volume-A includes four data blocks: 1A, 2A, 3A and 4A. The important region is defined as blocks 1A and 3A. Not shown in FIG. 10 are the corresponding volume-B 122 and the corresponding blocks on volume-B: 1B, 2B, 3B and 4B (see FIG. 1). It is to be understood that data in volume-A is a volume on primary system-A 110 (see FIG. 1). And it is further to be understood that a comparison in the present example, that involves a data block on volume-A means comparing the data block on volume-A (for example block 1A) against the respectively corresponding data block (block 1B) on volume-B 122 (see FIG. 1).

Some embodiments of the present invention include storage controller 1005. The storage controller includes bitmap 1020, counter 1010 and high-water mark, 1030. In the bitmap, each bit corresponds to a respective data block of the volume. For example, bitmap 1020 has 4 bits (bit-1, bit-2, bit-3 and bit-4), respectively corresponding to the four data blocks on volume-A 112/volume-B 122 (1A/1B, 2A/2B, 3A/3B and 4A/4B). Note that in FIG. 10, Volume-A is shown, whereas Volume-B, while included in the discussion, is not shown for the sake of simplicity. Note further, that in the embodiment and example of FIG. 10, the first bit index is 1). The storage controller initializes all bits of the bitmap to 0. Further, the storage controller initializes counter 1010 to 0. The counter tracks the number of chunks remaining to be compared. Each chunk that has been identified as important (and therefore comes under observation and is to be compared) will have its corresponding bit of the bitmap set to 1 through some means (for example, according to manual user input, programmatically, and/or as the result of a user-issued command).

In the example of FIG. 10, storage controller 1005 sets bit-1 and bit-3 (of bitmap 1020) to 1 to correspond respectively to data 1A/1B and 3A/3B. Bits 2 and 4 remain set at their initial values of 0, indicating that the respective blocks (2A/2B and 4A/4B) are not under observation and will not be included in the comparison process. The storage controller initializes the value of counter 1010 be equal to the number of bits of the bitmap that are set to 1. The counter tracks the number of chunks remaining to be compared. In the example, counter 1010 is set to 2 which is the (base-10) sum of the bits in bitmap 1020. If any bit of the bitmap is later flipped from 0 to 1, the storage controller increments the counter by 1.

Finally, storage controller 1005 uses high-water mark 1030, and initially sets the high-water mark value to 0. The value of the high-water mark points to a bit in bitmap 1020. As the high-water mark is incremented, the bitmap is stepped through, bit by bit, to identify those data blocks that will be processed for comparison.

As the process unfolds, if the value in counter 1010 is greater than 0 (meaning there remains at least one data chunk to be compared), storage controller 1005 steps through the bitmap by incrementing high-water mark 1030 until the bit pointed to by the value of the high-water mark is found to have been set to 1 (meaning the corresponding data block is marked for comparison).

To begin a simple example, the initial value (2) of counter 1010, indicates that two blocks remain to be compared. Bitmap 1020 is set to [1010] (the first and third bits are set to 1) to indicate that the first and third blocks are to be compared.

When the process begins, storage controller 1005 increments high-water mark 1030 from 0 to 1. The storage controller examines bit-1 of bitmap 1020, pointed to by the value of the high-water mark, and finds that it is set to 1. In response, the storage controller issues a command to System-A, to operate in concert with System-B to process their respective blocks (1A and 1B) for comparison. After the comparison is complete, the storage controller resets bit-1 to 0, indicating that a comparison between blocks 1A and 1B (not shown in FIG. 10, see FIG. 1) has been completed. The storage controller decrements counter 1010 from 2 to 1, meaning there remains 1 data block to be compared. In this example, the new value (1) of the counter is non-zero, so the process continues.

Storage controller 1005 increments high-water mark 1030 from 1 to 2, so it now points to bit-2 of bitmap 1020. The storage controller examines bit-2 of the bitmap and finds it is set to 0. Blocks 2A/2B are therefore not processed for comparison.

Storage controller 1005 increments high-water mark 1030 from 2 to 3, so it now points to bit-3 of bitmap 1020. The storage controller examines bit-3 of the bitmap and finds it is set to 1. In response, the storage controller issues a command to System-A, to operate in concert with System-B to process their respective blocks (3A and 3B) for comparison. After completion of the comparison process, the storage controller resets bit-3 to 0, indicating that a comparison between blocks 3A and 3B has been completed. The storage controller decrements the counter from 1 to 0. Because the counter value has reached 0 (and correspondingly, all bits of the bitmap are set to 0), the comparison process for volume 112 is complete.

At any time during the comparison process, if an additional data block is to be compared, storage controller 1005 examines the bit of bitmap 1020 that corresponds to the data block. If the storage controller finds that the corresponding bit is set to 0, the storage controller flips the bit to 1 and increments counter 1010. If the storage controller finds that the corresponding bit is already set to 1, the storage controller does not change the counter and does not change the bit of the bitmap.

Some embodiments of the present invention automatically set (to 1) a bit in the bitmap every time a corresponding data chunk is modified, thereby enabling automatic and continuous validation of recently-modified chunks. If the end of the bitmap is reached (meaning the value of the high-water mark equals the size of the bitmap) and the value of the counter is not equal to 0, it means that at least one data block had been updated during the comparison process and the updated blocks have not been compared.

In this case, the high-water mark is reset to 0 and the bitmap is stepped through again as described above. This process is repeated until value of the counter equals 0 meaning no further data chunks are marked for comparison.

Some embodiments of the present invention enable updating the bitmap, by adding data chunks to the set of data chunks under observation, while the comparison process is ongoing. This aspect will now be discussed in the following few paragraphs by way of a further example embodiment.

The function of the bitmap is to keep track of the data blocks that need to be compared. The bitmap is initialized by a "user" of the algorithm, which may be a different part of the storage system program (for example, one responding to a report from a disk drive that data may be corrupt for a portion of the data).

In this embodiment, assume a user wishes to extend the range of chunks to be checked while the comparison process is underway, for example because a new report of data corruption is received.

This new report does not need to wait for the first comparison cycle to be completed before it can update the bitmap and counter to record the additional chunks to be compared. Provided the number of comparison requests is bounded, the comparison process will be bounded. It should be noted that multiple processes modifying the bitmap and counter may require an atomic update mechanism of some sort, for example spinlocks, to ensure correctness.

In this embodiment, the user wants to compare data blocks 2 and 3 (first bit index is 0) of a volume of 5 blocks (block 0 through block 4). Storage controller 1005 (see FIG. 10) initializes: the bitmap to [00110]; the counter to 2; and the high-water mark to 0.

The storage controller checks the value of bit 0, which is 0. In response, the storage controller increments the high-water mark to 1.

The storage controller checks the value of bit 1, which again is 0. In response, the storage controller increments the high-water mark to 2.

The storage controller checks the value of bit 2, which is 1. In response, the storage controller triggers a comparison between data block 2 on both volumes. After the comparison is complete, the storage controller resets bit 2 to 0, and the bitmap becomes [00010]. The storage controller decrements the counter from 2 to 1, and increments the high-water mark to 3.

The storage controller proceeds to check the value of bit 3, which is 1. Again in response, the storage controller triggers comparison between data block 3 on both volumes. After the comparison is complete, the storage controller resets bit 3 to 0, and the bitmap becomes [00000]. The storage controller decrements the counter from 1 to 0. Counter has reached 0, ending the comparison process.

Now assume that during the comparison process discussed above, the user wanted to also compare the blocks corresponding to bits 0 and 4, the corresponding bitmap is [10001]. Assume further that the user submits this latest change while bit 2 is being processed. After bit 2 has been processed, the storage controller increments the high-water mark to 3 and decrements the counter to 1. The storage controller then updates the current bitmap to fold in the bitmap of the new blocks to be processed by performing a bitwise OR operation as follows:

[00010] -Current bitmap after comparison of block 2.
[10001] -New bitmap for blocks 0 and 4.
[10011] -Bitwise OR of the two bitmaps. This is now the current bitmap.

The storage controller re-computes the value of the counter by counting the "1" bits in the bitmap (in other words, summing up the bits), yielding a value of 3.

The storage controller continues the comparison process as described above, continuing with block 3 (dictated by the value of the high-water mark), with counter value currently at 3.

When the high-water mark reaches 4 (the length of the bitmap) and bit 4 is processed, the counter will have been decremented to 1, meaning there is still one data block needing comparison. The high-water mark is reset to 0 and the process cycles through the bitmap once again as described above, until the counter reaches 0.

This means also that if the user issues a new request to compare block 2 any time after block 2 had already been compared and bit 2 had already been reset to 0, bit 2 would again be set to 1 (and the counter incremented in concert) in response to the new request, to allow block 2 to be compared again when the high-water mark reaches bit 2 again in a new cycle through the bitmap.

Quiescing or Queueing Host I/Os to Speed up Comparison

Some embodiments of the present invention accommodate changes in priorities. Scenarios where this flexibility is particularly useful include cases where: (i) a user may want to perform a comparison of a given volume in the shortest amount of time possible, and thus may want to use all available resources (the user is willing to sacrifice production speed for comparison speed); and (ii) a user may want to ensure that both copies are identical (for example, at a particular moment in time) and do not want to have host I/Os potentially making the two copies more different or complicating the comparison process.

Some embodiments of the present invention offer at least two solutions for the scenarios discussed in the paragraph above: (i) completely disabling host I/Os for the duration of the comparison process; and (ii) giving host I/Os a lower priority.

Giving host I/Os a lower priority such that the comparison and host I/O operations take equal priority, in which case comparison operations host I/O operations are processed strictly in chronological order. When an equal priority is given host I/Os and the comparison of data chunks, colliding host I/Os are processed normally until they complete.

Some embodiments of the present invention enable a user to switch easily between the different behaviors (higher priority to host I/Os or equal priorities for both host I/Os and comparisons.

Continuous Collision Between a Data Chunk Comparison and Host I/Os

Some embodiments of the present invention solve a potential problem where a data chunk is under comparison, yet due to frequent I/O activity, the comparison is continuously abandoned midstream and re-started, and therefore not able to be completed. In this regard, a collision counter is set up for each data chunk, initialized to 0, and incremented each time the data chunk experiences a collision during the comparison process. A threshold value is determined for the number of collisions that are to be permitted. If the value of the counter reaches the threshold value, then subsequent colliding host I/Os are delayed, to allow the comparison process to be completed. This may be done by the mechanism described in the previous section regarding I/O and comparison priorities, for a given data chunk. When the collision counter reaches the threshold value, the priority of the comparison of the chunk is set to match that of host I/Os, thereby allowing the comparison to proceed in a timely manner. This dynamic priority adjustment happens on a chunk-by-chunk basis, so the majority of writes may continue to take priority over the comparison process while some "troublesome" writes may be held in abeyance until the colliding comparison is completed. Some embodiments of the present invention allow a user to dynamically adjust the threshold to provide a fine-grained balance between comparison performance and host write latency.

Figure 11:
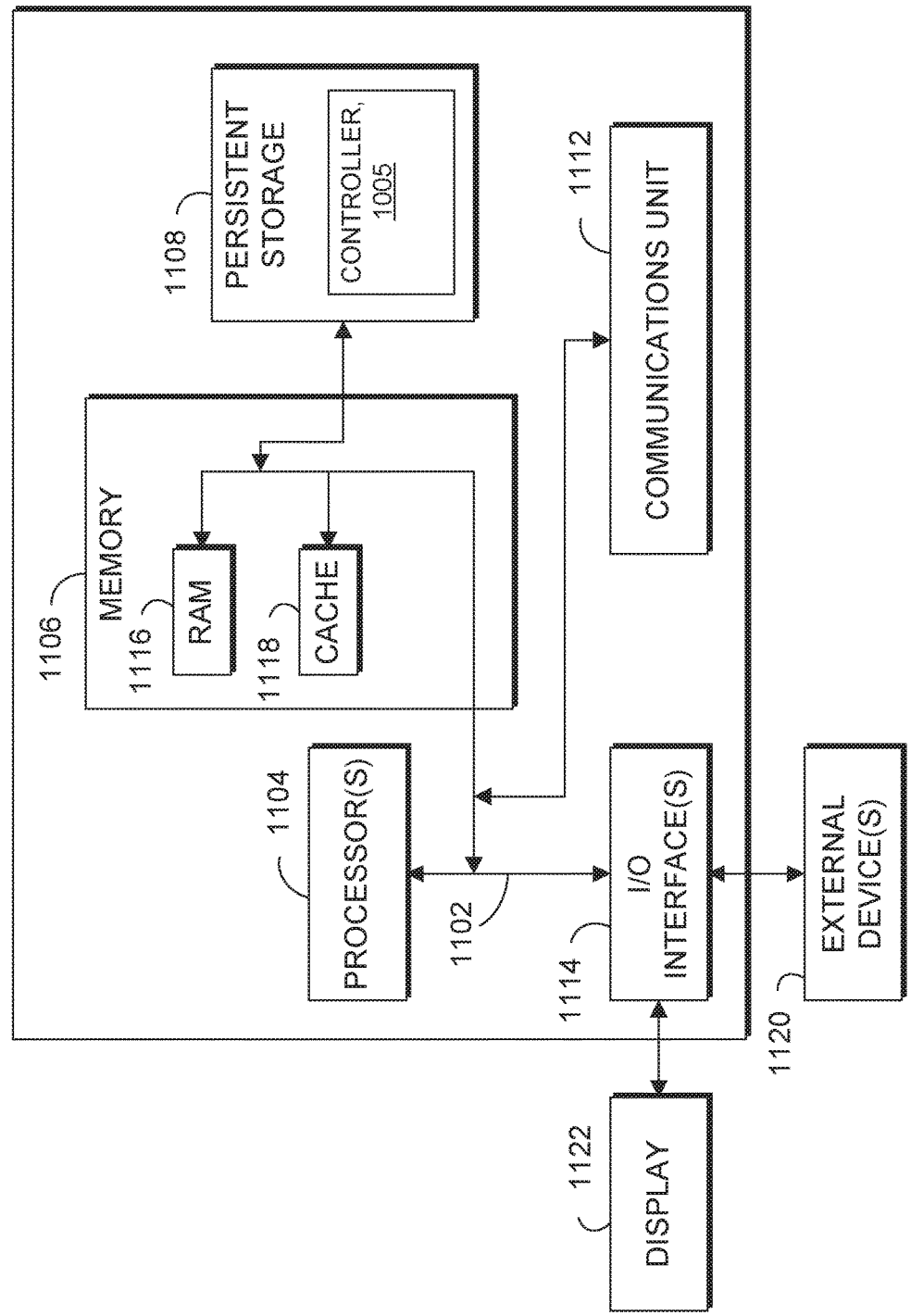
FIG. 11 is a block diagram depicting components of a computer, in accordance with at least one embodiment of the present invention.

FIG. 11 depicts a block diagram of components of computer 1100 in accordance with an illustrative embodiment of the present invention. It should be appreciated that FIG. 11 provides only an illustration of one implementation and does not imply any limitations with regard to the environments in which different embodiments may be implemented. Many modifications to the depicted environment may be made.

As depicted, the computer 1100 includes communications fabric 1102, which provides communications between computer processor(s) 1104, memory 1106, persistent storage 1108, communications unit 1112, and input/output (I/O) interface(s) 1114. Communications fabric 1102 can be implemented with any architecture designed for passing data and/or control information between processors (such as microprocessors, communications and network processors, etc.), system memory, peripheral devices, and any other hardware components within a system. For example, communications fabric 1102 can be implemented with one or more buses.

Memory 1106 and persistent storage 1108 are computer-readable storage media. In this embodiment, memory 1106 includes random access memory (RAM) 1116 and cache memory 1118. In general, memory 1106 can include any suitable volatile or non-volatile computer-readable storage media.

One or more programs may be stored in persistent storage 1108 for access and/or execution by one or more of the respective computer processors 1104 via one or more memories of memory 1106. In this embodiment, persistent storage 1108 includes a magnetic hard disk drive. Alternatively, or in addition to a magnetic hard disk drive, persistent storage 1108 can include a solid state hard drive, a semiconductor storage device, read-only memory (ROM), erasable programmable read-only memory (EPROM), flash memory, or any other computer-readable storage media that is capable of storing program instructions or digital information.

The media used by persistent storage 1108 may also be removable. For example, a removable hard drive may be used for persistent storage 1108. Other examples include optical and magnetic disks, thumb drives, and smart cards that are inserted into a drive for transfer onto another computer-readable storage medium that is also part of persistent storage 1108.

In some embodiments of the present invention, storage controller 1005 is stored in persistent storage 1108. Alternatively, storage controller 1005 may be stored on another system external to computer 1100, or dispersed among many systems and program application modules.

Communications unit 1112, in these examples, provides for communications with other data processing systems or devices. In these examples, communications unit 1112 includes one or more network interface cards. Communications unit 1112 may provide communications through the use of either or both physical and wireless communications links.

I/O interface(s) 1114 allows for input and output of data with other devices that may be connected to computer 1100. For example, I/O interface 1114 may provide a connection to external devices 1120 such as a keyboard, keypad, a touch screen, and/or some other suitable input device. External devices 1120 can also include portable computer-readable storage media such as, for example, thumb drives, portable optical or magnetic disks, and memory cards. Software and data used to practice embodiments of the present invention can be stored on such portable computer-readable storage media and can be loaded onto persistent storage 1108 via I/O interface(s) 1114. I/O interface(s) 1114 also connect to a display 1122.

Display 1122 provides a mechanism to display data to a user and may be, for example, a computer monitor.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the invention. The terminology used herein was chosen to optimal explain the principles of the embodiment, the practical application or technical improvement over technologies found in the marketplace, or to enable others of ordinary skill in the art to understand the embodiments disclosed herein.

What is claimed is:

1. A method for comparing storage volumes having ongoing input/output (I/O) activity, comprising:

receiving, by a local system, and from a requestor, a request to conduct a comparison process to determine whether or not a local data block on a local volume is identical to a remote data block on a remote volume;

responsive to receiving the request to conduct the comparison process, initiating the comparison process;

computing a first local hash based on the local data block;

receiving a host write command, with respect to the local data block and the remote data block, where the host write command is received during execution of the comparison process, and where the host write command has a higher execution priority than has the comparison process;

responsive to receiving the host write command, modifying the local data block in accordance with the host write command, to produce a modified local data block;

re-initiating the comparison process;

computing a second local hash based on the modified local data block; and sending the second local hash to a remote computer system for comparison with a remote hash.

2. The method of claim 1 further comprising:

receiving, from the remote computer system, a write completion message, indicating that the host write command has been processed at the remote computer system to produce a modified remote data block;

receiving, from the remote computer system, a comparison result, wherein the comparison result includes information to indicate whether or not the second local hash and the remote hash are identical; and sending the comparison result to the requestor.

3. The method of claim 1 wherein:

the remote data block is intended to be an identical copy of the local data block; and the host write command is directed to both the local data block and the remote data block.

4. The method of claim 2 wherein the comparison result includes information indicating whether the second local hash is identical to the remote hash.

5. The method of claim 2 wherein:

the second local hash is computed from the modified local data block, by application of a hashing algorithm to the modified local data block; and the remote hash is computed from the modified remote data block, by application of the hashing algorithm to the modified remote data block.

6. A method for comparing storage volumes having ongoing input/output (I/O) activity, comprising:

receiving, by a local system and from a remote system, a host write command, directed to a local data block of a local volume;

receiving, by the local system and from the remote system, a request to compare a local hash against a remote hash, where the request includes the remote hash and an identifier to identify the local data block;

modifying the local data block in accordance with the host write command, to produce a modified local data block;

sending a write completion message to the remote system.

7. The method of claim 6 further comprising:

reading the modified local data block;

computing the local hash based on the modified local data block;

comparing the local hash against the remote hash to produce a comparison result; and sending the comparison result to the remote system.

8. The method of claim 7 wherein the comparison result includes information indicating whether or not the local hash and the remote hash are identical.

9. The method of claim 6 wherein:

the local hash is computed by application of a hashing algorithm to the modified local data block; and the remote hash is computed by application of the hashing algorithm to a remote data block.

10. A computer program product for comparing storage volumes having ongoing input/output (I/O) activity, comprising:

one or more computer readable storage media that are not transitory signals per se, and program instructions stored on the one or more computer readable storage media, the program instructions comprising instructions to perform:

receiving a request, from a requestor, to initiate a comparison process between a local data block on a local volume and a remote data block on a remote volume, wherein the remote data block is a copy of the local data block, initiating the comparison process, receiving a host write command wherein the host write command is directed to at least one of the local data block, responsive to receiving the host write command, stopping the comparison process, responsive to receiving the host write command, modifying the local data block to produce a modified local data block, and re-initiating the comparison process to produce a comparison result.

11. The computer program product of claim 10, wherein program instructions to perform interrupting the comparison process further comprise program instructions to perform:

discarding an intermediate result produced by the comparison process;

discarding a pending program instruction with respect to the comparison process; and waiting for the host write operation to be completed with respect to the local data block and the remote data block.

12. The computer program product of claim 10, wherein the program instructions to perform re-initiating the comparison process further comprise program instructions to perform:

executing the comparison process to produce a comparison result; and sending the comparison result to the requestor.

13. The computer program product of claim 12, wherein program instructions to perform executing the entirety of the comparison process comprise program instructions to perform:

computing, by way of a hash function, a local hash of the modified local data block;

computing, by way of the hash function, a remote hash of the remote data block;

comparing the local hash and the remote hash to determine a comparison result where the comparison result includes information to indicate whether the local hash is identical to the remote hash; and sending, the comparison result to the requestor.

14. The computer program product of claim 10 wherein:

the computer program product is a computer system; and the computer program product further comprises one or more processors structured and/or connected in data communication with the storage medium so that the one or more processors executes computer instructions stored on the storage medium.

* * * * *